United States Patent
Shoji et al.

(10) Patent No.: US 9,203,335 B2
(45) Date of Patent: Dec. 1, 2015

(54) CONTROL DEVICE FOR ELECTRIC MOTOR AND CONTROL METHOD FOR ELECTRIC MOTOR

(75) Inventors: Mitsuhiro Shoji, Yamato (JP); Hideo Nakamura, Yokohama (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 44 days.

(21) Appl. No.: 14/112,749

(22) PCT Filed: Apr. 16, 2012

(86) PCT No.: PCT/JP2012/060258
§ 371 (c)(1),
(2), (4) Date: Oct. 18, 2013

(87) PCT Pub. No.: WO2012/144456
PCT Pub. Date: Oct. 26, 2012

(65) Prior Publication Data
US 2014/0042938 A1    Feb. 13, 2014

(30) Foreign Application Priority Data

Apr. 21, 2011  (JP) ................................. 2011-095197
Apr. 21, 2011  (JP) ................................. 2011-095198

(51) Int. Cl.
*H02P 21/00*  (2006.01)
*H02P 6/00*   (2006.01)
(Continued)

(52) U.S. Cl.
CPC ............ *H02P 21/05* (2013.01); *H02P 21/0035* (2013.01); *H02P 21/14* (2013.01); *H02P 21/145* (2013.01); *H02P 21/06* (2013.01)

(58) Field of Classification Search
CPC . H02P 21/00; H02P 21/0035; H02P 21/0089; H02P 21/06; H02P 21/466; H02P 2207/05; Y02T 10/643
USPC ........ 318/400.01, 400.02; 307/151; 363/1–12
See application file for complete search history.

(56) References Cited

U.S. PATENT DOCUMENTS 6,407,531 B1 *  6/2002  Walters et al. ................. 318/805
6,653,812 B1 * 11/2003  Huo et al. ...................... 318/801

(Continued)

FOREIGN PATENT DOCUMENTS

JP   2-276490 A    11/1990
JP   2000-50686 A   2/2000

(Continued)

*Primary Examiner* — Bentsu Ro
*Assistant Examiner* — Zemenay Truneh
(74) *Attorney, Agent, or Firm* — Foley & Lardner LLP

(57) ABSTRACT

A control device 1 for an electric motor of the present invention includes: a current control unit 4 configured to calculate voltage command values $v_d^*$, $v_q^*$ used to drive an electric motor 100, on the basis of a state quantity for voltage command value calculation and q and d-axis current detection values $i_d$, $i_q$, the state quantity calculated from a torque command value T*; and an over-modulation processing unit 16 configured to determine whether the electric motor 100 is stable or unstable in an over-modulation state, on the basis of the voltage command values $v_d^*$, $v_q^*$, current control constants, and electric motor constants, and to drive the electric motor 100 in the over-modulation state when determining that the electric motor 100 is stable.

28 Claims, 23 Drawing Sheets

(51) Int. Cl.
*H02P 21/05* (2006.01)
*H02P 21/14* (2006.01)
*H02P 21/06* (2006.01)

(56) References Cited

U.S. PATENT DOCUMENTS

| | | | |
|---|---|---|---|
| 7,039,542 B2* | 5/2006 | Fujii et al. | 702/115 |
| 7,049,779 B2* | 5/2006 | Chen et al. | 318/400.09 |
| 2005/0035676 A1* | 2/2005 | Rahman et al. | 310/83 |
| 2008/0218111 A1* | 9/2008 | Okamura | 318/453 |
| 2009/0237019 A1* | 9/2009 | Yamakawa et al. | 318/400.09 |
| 2009/0237021 A1* | 9/2009 | Yamamoto et al. | 318/400.15 |
| 2009/0256518 A1* | 10/2009 | Kitanaka et al. | 318/802 |
| 2010/0013421 A1* | 1/2010 | Itoh | 318/400.09 |
| 2010/0066283 A1* | 3/2010 | Kitanaka | 318/400.02 |
| 2010/0219780 A1* | 9/2010 | Morimoto et al. | 318/400.02 |
| 2010/0301788 A1* | 12/2010 | Chen et al. | 318/400.3 |
| 2011/0074320 A1* | 3/2011 | Nakamura et al. | 318/400.02 |
| 2013/0214711 A1* | 8/2013 | Omata et al. | 318/400.02 |

FOREIGN PATENT DOCUMENTS

| | | |
|---|---|---|
| JP | 2002-72771 A | 3/2002 |
| JP | 2010-259130 A | 11/2010 |
| JP | 2011-72103 A | 4/2011 |

* cited by examiner

FIG. 14
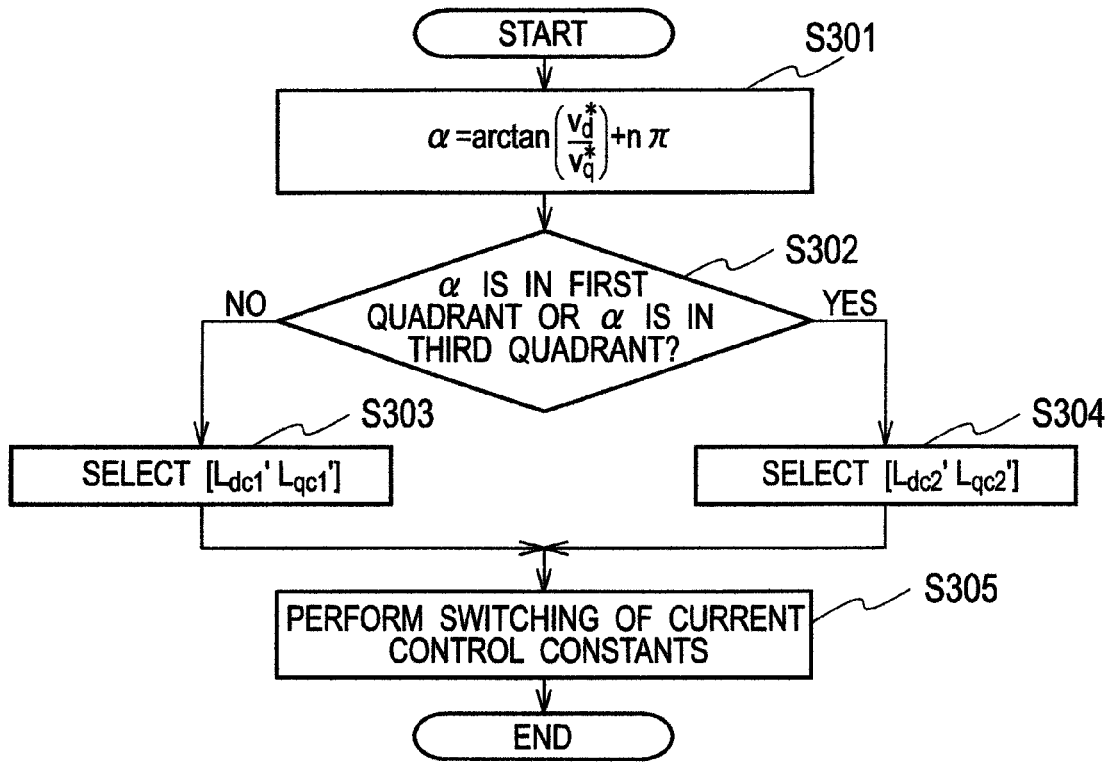
FIG. 15
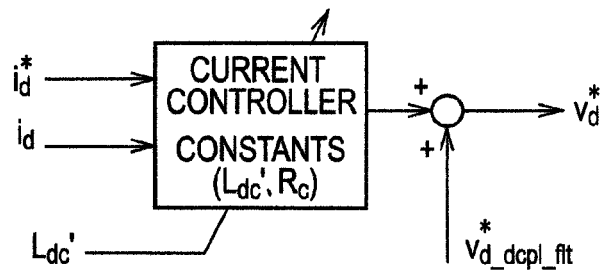
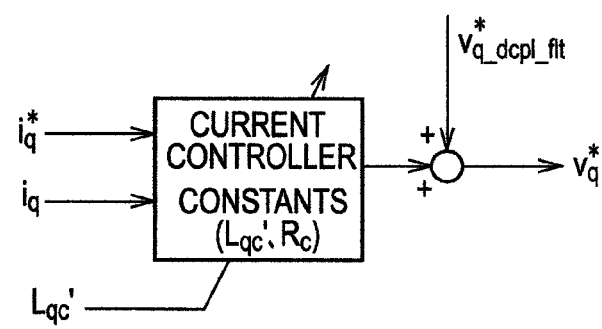

CONTROL DEVICE FOR ELECTRIC MOTOR AND CONTROL METHOD FOR ELECTRIC MOTOR

TECHNICAL FIELD

The present invention relates to a control device for an electric motor and a control method for an electric motor which control an electric motor by performing vector control, and particularly relates to a control device for an electric motor and a control method for an electric motor which drive an electric motor by determining whether the electric motor is stable or unstable in an over-modulation state.

BACKGROUND ART

Conventionally, in an AC electric motor, so-called current vector control has been performed in which current feedback control is performed on d and q axes. Patent Literature 1 discloses an example of a drive control device for an AC electric motor which performs such current vector control.

In the conventional drive control device for an AC electric motor disclosed in Patent Literature 1, different types of control are performed in a normal modulation region in which a pseudo sine wave voltage can be achieved by pulse width modulation and an over-modulation region in which a voltage is applied beyond the range of the normal modulation region. The control is performed to reduce a torque shock which occurs in the electric motor in transition from the normal modulation region to the over-modulation region. Current control is used in the normal modulation region while voltage control and square wave control are used in the over-modulation region to be changed according to the situation.

CITATION LIST

Patent Literature

Patent Literature 1: Japanese Patent Application Publication No. 2000-50686

SUMMARY OF INVENTION

However, the conventional drive control device for an AC electric motor described above does not determine whether the electric motor is stable or unstable in the over-modulation region and can thus perform only the simple control using the square wave. This reduces the usage rate of a power supply voltage. Accordingly, the conventional drive control device has a problem that the efficiency of the electric motor is reduced and the output of the electric motor cannot be thereby improved.

Moreover, the conventional drive control device has the following problems. Since switching among the three control methods is performed between the normal modulation region and the over-modulation region, processing for seamlessly switching the control method is complicated. In addition, resources of a processing device are required for each of the control methods and this increases the cost required for hardware and adaptation.

Furthermore, the conventional drive control device has the following problem. Since the torque is controlled by controlling a voltage phase in the voltage control and the square wave control, voltage amplitude cannot be controlled and a current control performance deteriorates compared to the case where current control is performed. A harmonic wave current due to a modeling error and disturbance thereby flows and the efficiency deteriorates.

The present invention has been proposed in view of the circumstances described above and an object thereof is to provide a control device for an electric motor and a control method for an electric motor which can achieve improvements in efficiency and output of an electric motor by improving the usage rate of a power supply voltage even when the electric motor is in the over-modulation state.

The control device for the electric motor of the present invention solves the problems described above by including: a current control unit configured to calculate a voltage command value used to drive the electric motor, on the basis of a state quantity for voltage command value calculation and a current detection value detected from the electric motor, the state quantity calculated from a torque command value; and an over-modulation processing unit configured to determine whether the electric motor is stable or unstable in an over-modulation state, on the basis of a phase of the voltage command value and a state quantity for control which is used to control the electric motor, and to drive the electric motor on the basis of a result of the determination.

BRIEF DESCRIPTION OF DRAWINGS

FIG. 14 is a flowchart showing a procedure of control processing for the electric motor performed by the control device for the electric motor in the third embodiment to which the present invention is applied.

FIG. 15 is a block diagram showing a current control system of the electric motor in the third embodiment to which the present invention is applied in a simplified manner.

DESCRIPTION OF EMBODIMENTS

First to sixth embodiments to which the present invention is applied are described below with reference to the drawings.

First Embodiment

[Overall Configuration of Control Device for Electric Motor]

Figure 1:
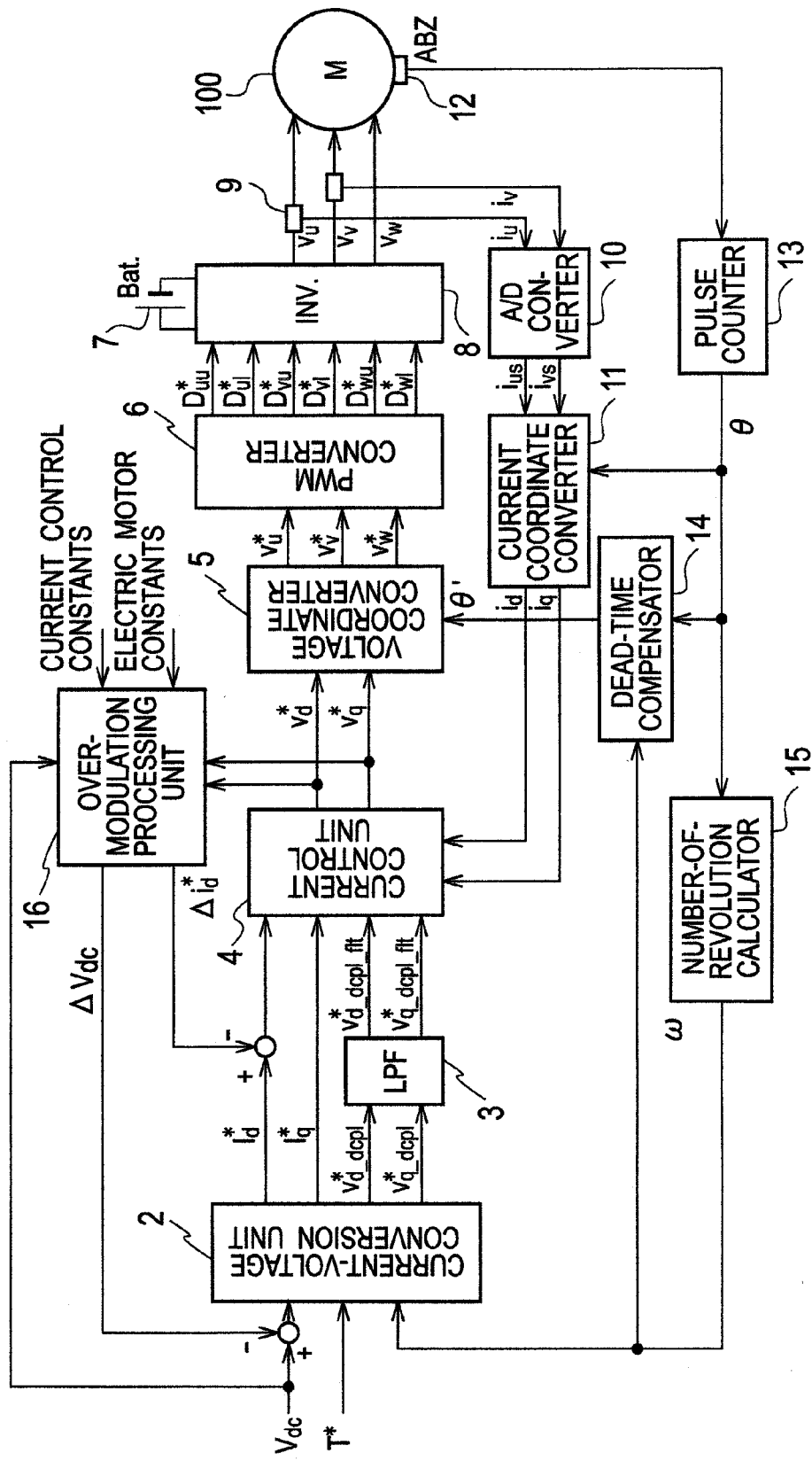
FIG. 1 is a block diagram showing an overall configuration of a control device for an electric motor in a first embodiment to which the present invention is applied.

FIG. 1 is a block diagram showing an overall configuration of a control device for an electric motor in the embodiment.

As shown in FIG. 1, a control device 1 for the electric motor in the embodiment is a control device configured to control an electric motor 100 by current vector control and includes: a current-voltage conversion unit 2 configured to calculate a state quantity for voltage command value calculation from a torque command value T* by referring to a current-voltage conversion map stored in advance; a low-pass filter 3 configured to remove high-frequency components in d and q-axis non-interference voltage command values $v_{d\_dcp1}{}^{*}$, $v_{q\_dcp1}{}^{*}$ outputted from the current-voltage conversion unit 2; a current control unit 4 configured to calculate d and q-axis voltage command values $v_d{}^{*}$, $v_q{}^{*}$ used to drive the electric motor 100, on the basis of the state quantity for voltage command value calculation and current detection values $i_d$, $i_q$ detected from the electric motor 100; a voltage coordinate converter 5 configured to calculate voltage command values $v_u{}^{*}$, $v_v{}^{*}$, $v_w{}^{*}$ of respective U, V, W phases by performing coordinate conversion processing on the d and q-axis voltage command values $v_d{}^{*}$, $v_q{}^{*}$; a PWM converter 6 configured to generate drive signals $D_{uu}{}^{*}$, $D_{ul}{}^{*}$, $D_{vu}{}^{*}$, $D_{vl}{}^{*}$, $D_{wu}{}^{*}$, $D_{wl}{}^{*}$ for switching elements, according to the voltage command values $v_u{}^{*}$, $v_v{}^{*}$, $v_w{}^{*}$; an inverter 8 configured to convert a DC voltage of a DC power source 7 to AC voltages $v_u$, $v_v$, $v_w$ according to the drive signals $D_{uu}{}^{*}$, $D_{ul}{}^{*}$, $D_{vu}{}^{*}$, $D_{vl}{}^{*}$, $D_{wu}{}^{*}$, $D_{wl}{}^{*}$ and supply the AC voltages $v_u$, $v_v$, $v_w$ to the electric motor 100; current sensors 9 configured to detect currents to be supplied to the electric motor 100; a current coordinate converter 11 configured to calculate the d and q-axis current detection values $i_d$, $i_q$ by performing coordinate conversion processing on $i_{us}$, $i_{vs}$ obtained by sampling the currents detected by the current sensors 9 with an A/D converter 10; a magnetic pole position detector 12 configured to output pulses of A, B, Z phases, according to the position of a rotor of the electric motor 100; a pulse counter 13 configured to count the pulses from the magnetic pole position detector 12 and output position information θ of the rotor; a dead-time compensator 14 configured to compensate for a dead time of the position information θ of the rotor and output a magnetic pole position detection value θ' of the rotor after the dead-time compensation; a number-of-revolution calculator 15 configured to calculate an electric angular velocity ω from the position information θ of the rotor and output the electric angular velocity ω; and an over-modulation processing unit 16 configured to determine whether the electric motor 100 is stable or unstable in an over-modulation state, on the basis of the d and q-axis voltage command values $v_d{}^{*}$, $v_q{}^{*}$ and a state quantity used to control the electric motor 100, and to drive the electric motor 100.

The electric motor 100 is a permanent-magnet synchronous electric motor and is driven by the so-called current vector control in which a current feedback control is performed on d and q-axes, where the d-axis is defined as a magnetic axis direction of a rotor magnet and the q-axis is defined as a direction orthogonal to the d-axis.

The current-voltage conversion unit 2 calculates and outputs d and q-axis current command values id*, iq* and the d and q-axis non-interference voltage command values $v_{d\_dcp1}^*$, $v_{q\_dcp1}^*$ which are the state quantities for voltage command value calculation, by referring to the current-voltage conversion map in which the received torque command value T*, the received electric angular velocity ω of the electric motor 100, and a voltage detection value $V_{dc}$ of the DC power source 7 inputted into the inverter 8 are used as indices.

The current control unit 4 performs current control calculation by receiving the d and q-axis current command values id*, iq*, the d and q-axis current detection values $i_d$, $i_q$, and $v_{d\_dcp1\_flt}^*$, $v_{q\_dcp1\_flt}^*$ obtained by subjecting the d and q-axis non-interference voltage command values $v_{d\_dcp1}$, $v_{q\_dcp1}^*$ to LPF processing as inputs, and thereby outputs the d and q-axis voltage command values $v_d^*$, $v_q^*$.

The voltage coordinate converter 5 calculates the voltage command values $v_u^*$, $v_v^*$, $v_w^*$ of respective U, V, W phases by receiving the d and q-axis voltage command values $v_d^*$, $v_q^*$ and the magnetic pole position detection value θ' of the rotor after the dead-time compensation and by performing coordinate conversion processing shown in formula (1), and then outputs the voltage command values $v_u^*$, $v_v^*$, $v_w^*$.

[Math 1]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta' & -\sin\theta' \\ \sin\theta' & \cos\theta' \end{bmatrix} \begin{bmatrix} v_d^* \\ v_q^* \end{bmatrix} \quad (1)$$

The current sensors 9 detect currents of two phases (for example, $i_u$ and $i_v$ of the U and V phases) among currents of the three phases, and $i_{us}$, $i_{vs}$ sampled through the A/D converter 10 are inputted into the current coordinate converter 11. In a case where the current sensors 9 are provided only for two phases, the current value of the remaining one phase which is not detected can be obtained from formula (2) in principle.

$$i_{ws} = -i_{us} - i_{vs} \quad (2)$$

Upon receiving $i_{us}$, $i_{vs}$ outputted from the A/D converter 10, the current coordinate converter 11 calculates the d and q-axis current detection values $i_d$, $i_q$ by using formula (3).

[Math 2]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{us} \\ i_{vs} \\ i_{ws} \end{bmatrix} \quad (3)$$

The over-modulation processing unit 16 acquires the d and q-axis voltage command values $v_d^*$, $v_q^*$, the voltage detection value $V_{dc}$ of the DC power source 7, and current control constants and electric motor constants which are the state quantities for control, and outputs a correction value $\Delta V_{dc}$ for correcting the voltage detection value $V_{dc}$ of the DC power source 7 and a correction value $\Delta i_d^*$ for the d-axis current command value $i_d^*$ to deal with the over-modulation state of the electric motor 100.

[Configuration of Over-Modulation Processing Unit]

Figure 2:
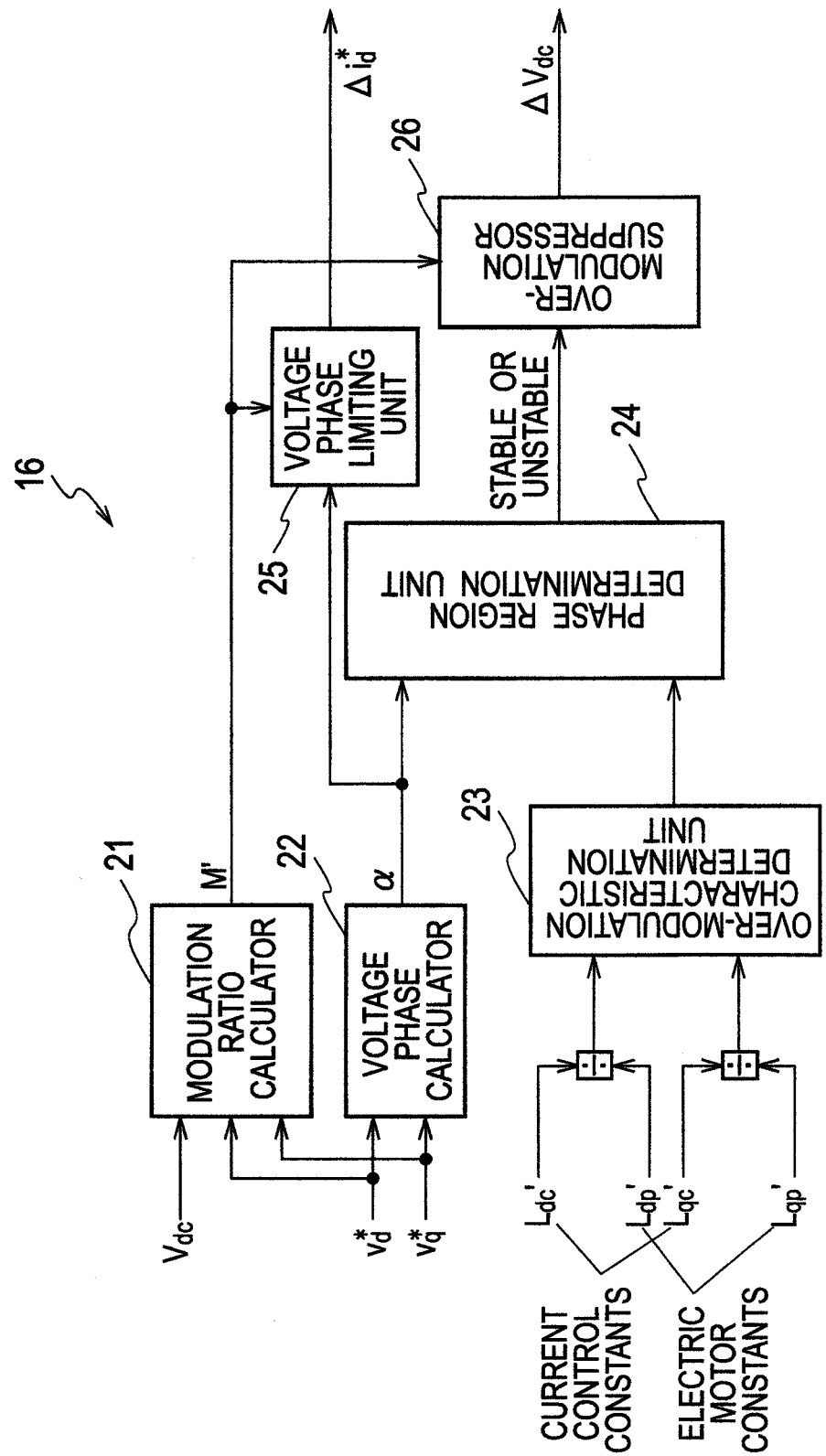
FIG. 2 is a block diagram showing a configuration of an over-modulation processing unit in the first embodiment to which the present invention is applied.

FIG. 2 is a block diagram showing a configuration of the over-modulation processing unit 16 in the embodiment.

As shown in FIG. 2, the over-modulation processing unit 16 in the embodiment includes: a modulation ratio calculator 21 configured to calculate a modulation ratio M' of the electric motor 100; a voltage phase calculator 22 configured to calculate a phase α of the voltage command value; an over-modulation characteristic determination unit 23 configured to determine a characteristic related to stability of the electric motor 100 in the over-modulation state, on the basis of current control constants $L_{dc}'$, $L_{qc}'$ and electric motor constants $L_{dp}'$, $L_{qp}'$; a phase region determination unit 24 configured to determine whether the electric motor 100 is stable or unstable in the over-modulation state, on the basis of the phase α of the voltage command value; a voltage phase limiting unit 25 configured to change the current command value in such a way that the phase α of the voltage command value is in a phase region in which the electric motor 100 is stable in the over-modulation state; and an over-modulation suppressor 26 configured to suppress the modulation ratio M' when the electric motor 100 is unstable in the over-modulation state.

The modulation ratio calculator 21 calculates the modulation ratio M' of the voltage command value on the basis of formula (4).

[Math 3]

$$M' = \frac{\sqrt{2} \cdot \sqrt{v_d^{*2} + v_q^{*2}}}{V_{dc}} \quad (4)$$

The voltage phase calculator 22 obtains the phase α of the voltage command value based on the q-axis, on the basis of formula (5) which is a formula of inverse trigonometric function.

[Math 4]

$$\alpha = \arctan\left(\frac{v_d^*}{v_q^*}\right) + n\pi \quad (n \text{ is } -1, 0, \text{ or } 1) \quad (5)$$

The over-modulation characteristic determination unit 23 acquires the current control constants $L_{dc}'$, $L_{qc}'$, and the electric motor constants $L_{dp}'$, $L_{qp}'$ which are the state quantities for control and calculates the ratios of these constants to obtain inductance ratios $L_{qc}'/L_{qp}'$, $L_{dc}'/L_{dp}'$. The over-modulation characteristic determination unit 23 determines the characteristc related to the stability of the electric motor 100 in the over-modulation state, on the basis of the thus-obtained inductance ratios.

The phase region determination unit 24 indentifies a stable phase region in which the electric motor 100 is stable in the over-modulation state, according to the characteristic determined by the over-modulation characteristic determination unit 23, and determines whether the electric motor 100 is stable or unstable in the over-modulation state, based on whether the phase α of the voltage command value is in the stable phase region or not.

When the electric motor 100 is unstable in the over-modulation state, the voltage phase limiting unit 25 changes the d-axis current command value $i_d^*$ by outputting the correction value $\Delta i_d^*$ for the d-axis current command value $i_d^*$. The phase α of the voltage command value is thereby moved into the phase region in which the electric motor 100 is stable in the over-modulation state.

When the electric motor 100 is unstable in the over-modulation state, the over-modulation suppressor 26 changes the voltage detection value $V_{dc}$ by outputting the correction value $\Delta V_{dc}$ for correcting the voltage detection value $V_{dc}$ of the DC power source 7, and thereby suppresses the modulation ratio M'.

[Procedure of Control Processing for Electric Motor]

Next, a procedure of control processing for the electric motor performed by the control device 1 for the electric motor in the embodiment is described with reference to the flowchart of FIG. 3.

Figure 3:
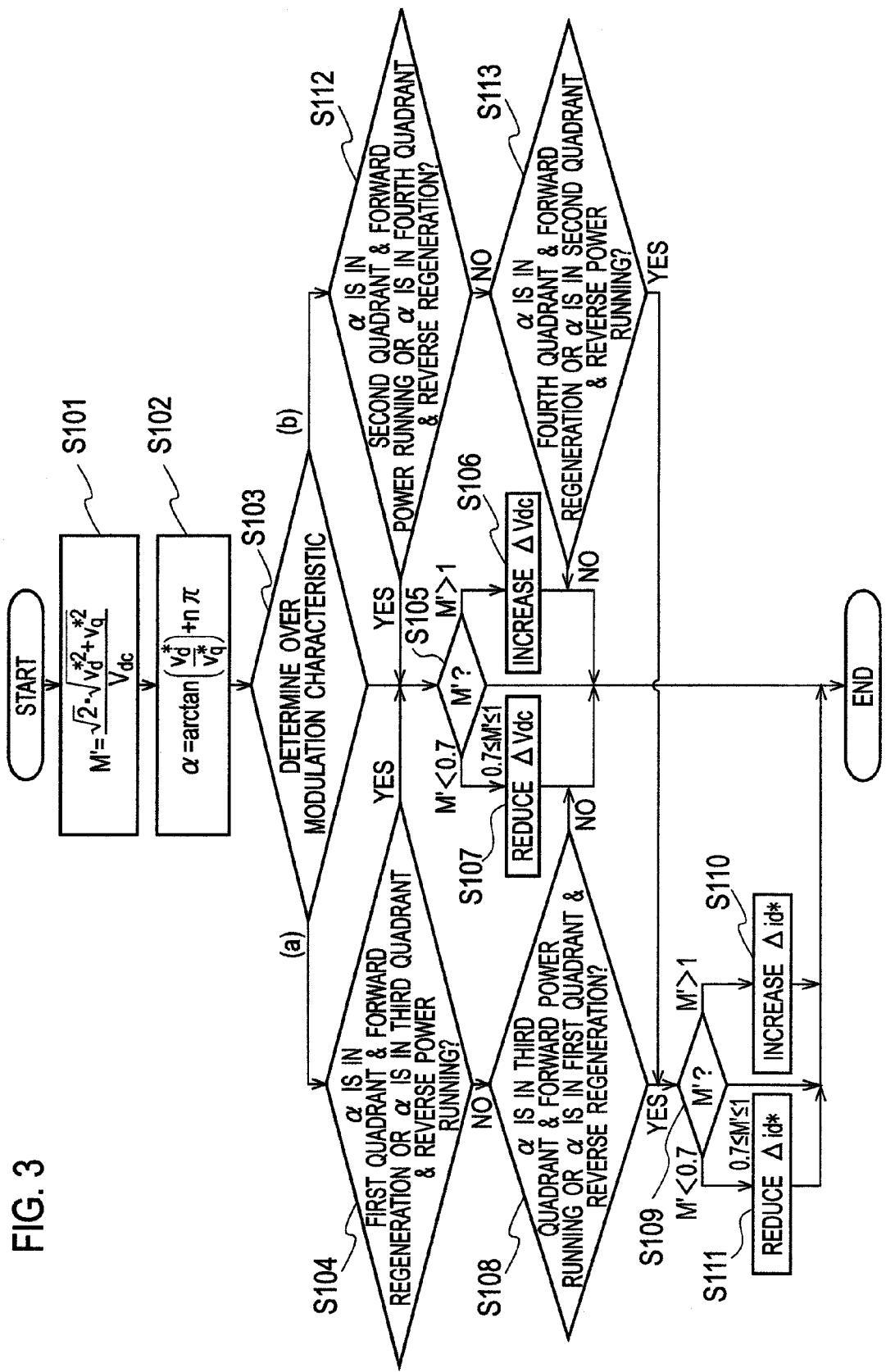
FIG. 3 is a flowchart showing a procedure of control processing for the electric motor performed by the control device for the electric motor in the first embodiment to which the present invention is applied.

As shown in FIG. 3, the modulation ratio calculator 21 calculates the modulation ratio M' of the electric motor 100 in step S101, and the voltage phase calculator 22 calculates the phase α of the voltage command value in step S102. Then, in step S103, the over-modulation characteristic determination unit 23 determines the characteristic related to stability in the over-modulation state.

The processing by the over-modulation characteristic determination unit 23 is described in detail.

Figure 4:
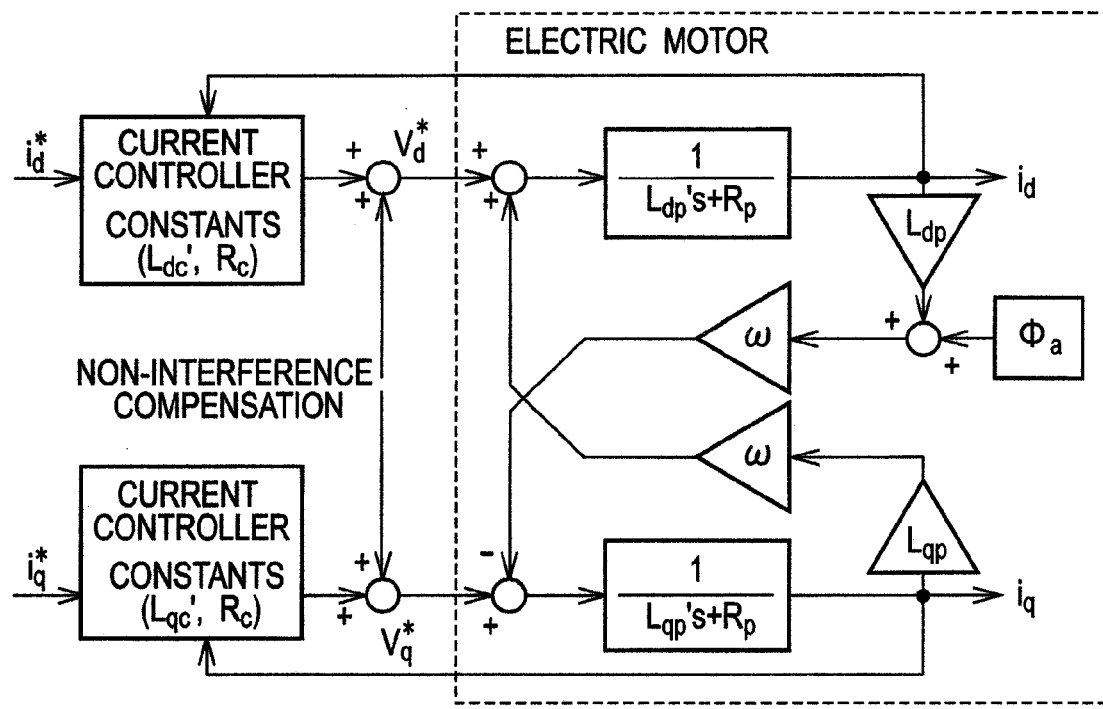
FIG. 4 is a block diagram showing, in a simplified manner, a current control system of the electric motor in the first embodiment to which the present invention is applied.

The over-modulation characteristic determination unit 23 first acquires the current control constants $L_{dc}'$, $L_{qc}'$ and the electric motor constants $L_{dp}'$, $L_{qp}'$ which are the state quantities for control and calculates the ratios of these constants to obtain the inductance ratios $L_{qc}'/L_{qp}'$, $L_{dc}'/L_{dp}'$. The current control constants $L_{dc}'$, $L_{qc}'$ are inductance values of the current control unit 4 and the electric motor constants $L_{dp}'$, $L_{qp}'$ are inductance values of the electric motor 100. These inductance values are specifically described with reference to FIG. 4 in which a current control system is illustrated in a simplified manner. The electric motor constants $L_{dp}'$, $L_{qp}'$ are constants in blocks in the electric motor 100 in which first order transfer functions are shown. The current control constants $L_{dc}'$, $L_{qc}'$ are constants used to design a current controller included in the current control unit 4.

The inductance values of the electric motor 100 include inductance values $L_{dp}$, $L_{qp}$ which are observed in an interference path between the d and q axes and the inductance values $L_{dp}'$, $L_{qp}'$ which are used in the first order transfer functions between the current and the voltage. These inductance values have physical meanings different from each other and take different values when there is magnetic saturation. Hence, the inductance values are distinguished also by symbols (since the inductance values take the same value when there is no magnetic saturation, they may be denoted by the same symbols in such a case).

Generally, in the current control system, response characteristics are designed with respect to remaining first-order dynamics under the assumption that the control of completely eliminating the interference voltage is established. Accordingly, the current control system is designed with the electric motor constants being $L_{dp}'$, $L_{qp}'$ and a nominal value of a coil resistance $R_p$ being $R_c$.

Then, the over-modulation characteristic determination unit 23 determines a type of the over-modulation stability which is the characteristic related to stability in the over-modulation state, by using the inductance ratios $L_{qc}'/L_{qp}'$, $L_{dc}'/L_{dp}'$ described above.

Figure 5:
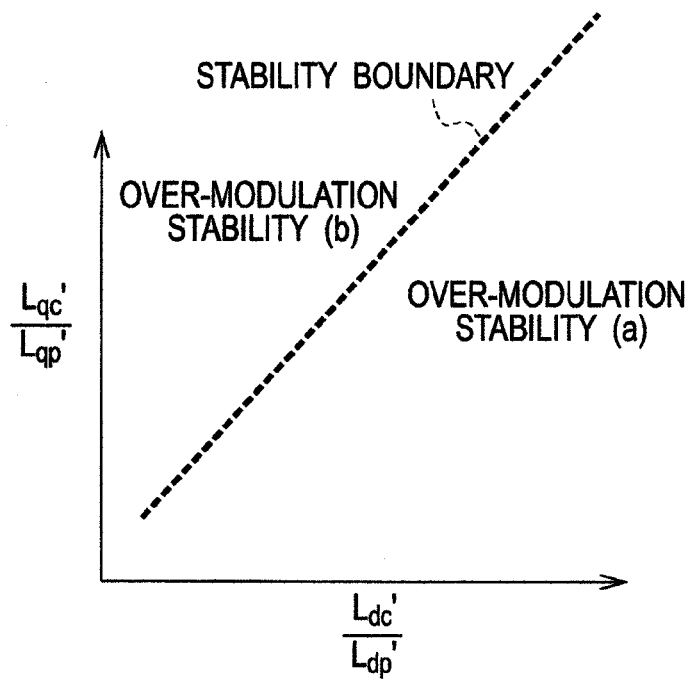
FIG. 5 is a graph for explaining a method of determining a type of over-modulation stability in the control device for the electric motor in the first embodiment to which the present invention is applied.

Description is given of a method of determining the type of the over-modulation stability with reference to FIG. 5. It is known that, when a graph with the inductance ratio $L_{qc}'/L_{qp}'$ on the vertical axis and the inductance ratio $L_{dc}'/L_{dp}'$ on the horizontal axis is drawn as shown in FIG. 5, the over-modulation stability indicating characteristics of the electric motor 100 in the over-modulation state is divided into two types at a stability boundary near the center. In FIG. 5, a region below the stability boundary is over-modulation stability (a) and a region above the stability boundary is over-modulation stability (b). Note that the stability boundary can be obtained in advance through analysis.

Accordingly, the over-modulation characteristic determination unit 23 stores information as shown in FIG. 5 in advance and determines whether the type of the over-modulation stability is (a) or (b) according to the obtained inductance ratios.

After the type of the over-modulation stability is determined in step S103 as described above, the processing proceeds to step S104 or step S112 depending on the type of the over-modulation stability. Here, description is given of the case where the over-modulation stability is (a) and the processing proceeds to step S104.

In step S104, the phase region determination unit 24 determines whether the electric motor 100 is stable or unstable in the over-modulation state, on the basis of the phase α of the voltage command value.

A method of determining whether the electric motor 100 is stable or unstable in step S104 is described with reference to FIG. 6.

Figure 6:
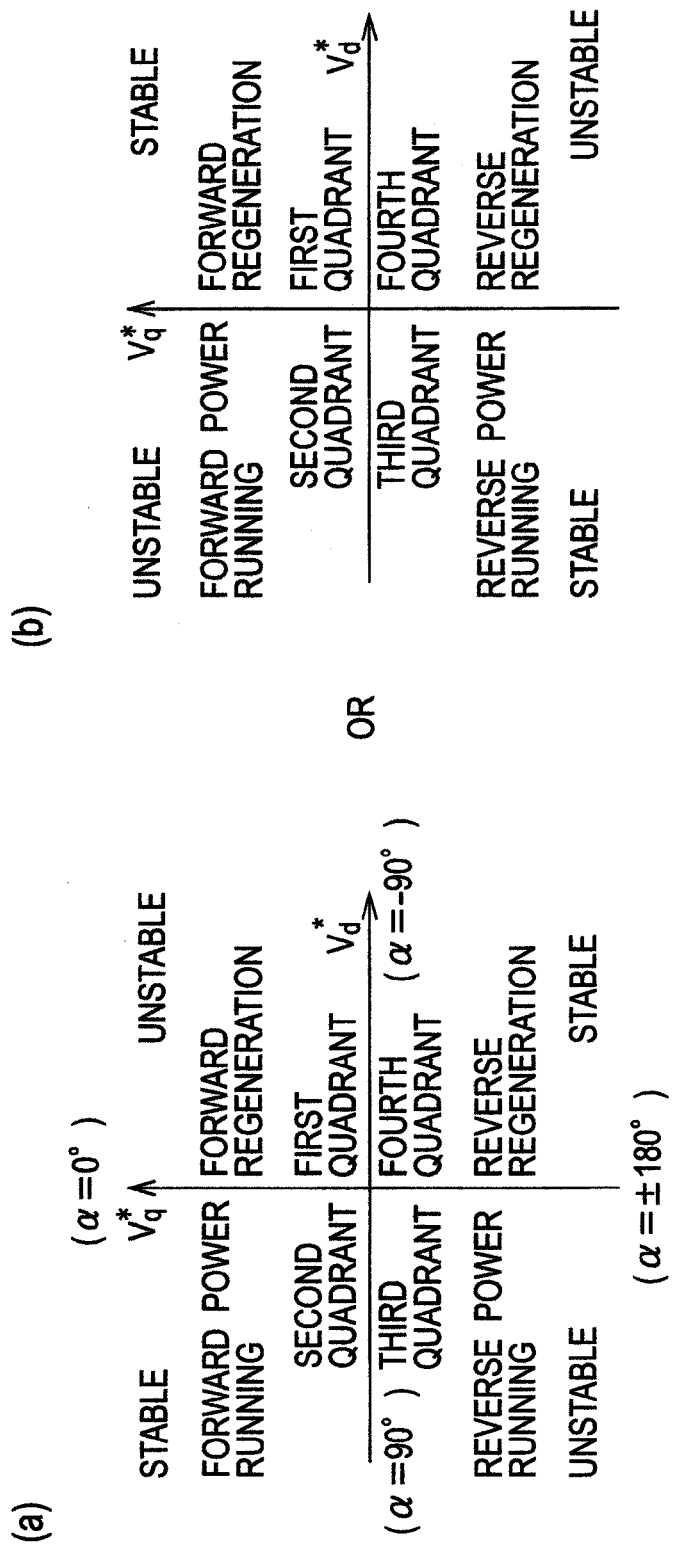
FIG. 6 includes graphs for explaining a method of determining whether the electric motor is stable or unstable in the control device for the electric motor in the first embodiment to which the present invention is applied.

FIG. 6(a) is a graph of a case where the over-modulation stability is (a) and FIG. 6(b) is a graph of a case where the over-modulation stability is (b). As shown in FIG. 6, the state of the electric motor 100 changes to stable or unstable every time the quadrant changes on a coordinate system defined in the d-axis direction which is the magnetic pole direction and the q-axis direction which is orthogonal to the d-axis direction.

Specifically, as shown in FIG. 6(a), in a case where the over-modulation stability is (a), the electric motor 100 is unstable when the phase α of the voltage command value extends into the first quadrant, is stable when the phase α of the voltage command value extends into the second quadrant, is unstable when the phase α of the voltage command value extends into the third quadrant, and is stable when the phase α of the voltage command value extends into the fourth quadrant. As described above, the electric motor 100 has such a characteristic that, in the over-modulation state, a type of the phase region is alternately reversed between the stable phase region and the unstable phase region in the four quadrants on the d and q axes.

Moreover, in a case where the over-modulation stability is (b), the stable phase regions and the unstable phase regions are reversed from those of FIG. 6(a) as shown in FIG. 6(b).

Hence, the phase region determination unit 24 can determine whether the electric motor 100 is stable or unstable in the over-modulation state by referring to FIG. 6(a) or FIG. 6(b) depending on whether the over-modulation stability is (a) or (b) and by determining whether the phase α of the voltage command value is in the stable phase region or the unstable phase region.

In step S104, the phase region determination unit 24 determines whether the phase α of the voltage command value is in any of the first quadrant in forward regeneration and the third quadrant in reverse power running. If so, the phase region determination unit 24 determines that the electric motor 100 is unstable and the processing proceeds to step S105.

In step S105, whether the modulation ratio M' is larger than a first threshold 1.0 and is smaller than a second threshold 0.7 is determined. When the modulation ratio M' is larger than 1.0, the electric motor 100 is unstable in the over-modulation state. Accordingly, in step S106, the over-modulation suppressor 26 increases the correction value $\Delta V_{dc}$ for the voltage detection value $V_{dc}$ and outputs it (Note that $\Delta V_{dc} \geq 0$). As shown in FIG. 1, since the correction value $\Delta V_{dc}$ is subtracted from the voltage detection value $V_{dc}$, the voltage detection value $V_{dc}$ to be inputted to the current-voltage conversion unit 2 is reduced and the modulation ratio M' is thereby reduced. The control processing for the electric motor in the embodiment is then terminated.

Meanwhile, when the modulation ratio M' is equal to or larger than 0.7 and is equal to or smaller than 1.0 in step S105, necessity for correction is small. Accordingly, the control processing for the electric motor in the embodiment is terminated without performing further processing even when the electric motor 100 is unstable.

Furthermore, since the modulation ratio M' is small when the modulation ratio M' is smaller than 0.7 in step S105, the over-modulation suppressor 26 reduces the correction value $\Delta V_{dc}$ for the voltage detection value $V_{dc}$ and outputs it in step S107. Reducing the correction value $\Delta V_{dc}$ increases the voltage detection value $V_{dc}$ to be inputted to the current-voltage conversion unit 2 and the modulation ratio M' is thereby increased. The control processing for the electric motor in the embodiment is then terminated.

Next, when the phase α of the voltage command value is in neither of the first quadrant in the forward regeneration nor the third quadrant in the reverse power running in step S104, the processing proceeds to step S108 and the phase region determination unit 24 determines whether the phase α of the voltage command value is in any one of the third quadrant in the forward power running and the first quadrant in the reverse regeneration. When the phase α is in neither of the quadrants, the phase α of the voltage command value is located in the second quadrant or in the fourth quadrant. Accordingly, the electric motor 100 is determined to be stable and the control processing for the electric motor in the embodiment is terminated without performing further processing.

Meanwhile, when the phase α of the voltage command value is in any one of the third quadrant in the forward power running and the first quadrant in the reverse regeneration in step S108, the electric motor 100 is determined to be unstable and the processing proceeds to step S109. In step S109, whether the modulation ratio M' is larger than the first threshold 1.0 and is smaller than the second threshold 0.7 is determined. When the modulation ratio is M' is larger than 1.0, the electric motor 100 is unstable in the over-modulation state. Accordingly, in step S110, the voltage phase limiting unit 25 increases the correction value $\Delta i_d^*$ for the current command value $i_d^*$ and outputs it (Note that $\Delta i_d^* \geq 0$, $i_d^* < 0$). As shown in FIG. 1, since the correction value $\Delta i_d^*$ is added to the current command value $i_d^*$, the current command value id* to be inputted to the current control unit 4 is reduced and the phase α of the voltage command value is thus moved and shifted to the stable phase region.

For example, in FIG. 6(a), in an operation mode of forward power running, the electric motor is stable even in the over-modulation when the phase α of the voltage command value is mainly in the second quadrant. However, when the d-axis current is large in the negative direction, the phase α reaches the third quadrant and the electric motor 100 becomes unstable (how much the d-axis current can be increased before the phase α reaches the third quadrant varies depending on the temperature of the electric motor and the like). Reducing the d-axis current according to the phase α of the voltage command value enables the phase α of the voltage command value to move to the second quadrant which is the stable phase region, without reducing the modulation ratio. Hence, the electric motor 100 can be made stable even in the over-modulation. After the correction value $\Delta i_d^*$ is increased in step S110 as described above, the control processing for the electric motor in the embodiment is terminated.

Moreover, since necessity for correction is small when the modulation ratio M' is equal to or larger than 0.7 and is equal to or smaller than 1.0 in step S109, the control processing for the electric motor in the embodiment is terminated without performing further processing even when the electric motor 100 is unstable.

Furthermore, since the modulation ratio M' is small when the modulation ratio M' is smaller than 0.7 in step S109, the voltage phase limiting unit 25 reduces the correction value $\Delta i_d^*$ for the current command value $i_d^*$ and outputs it in step S111. Then, the control processing for the electric motor in the embodiment is terminated.

Moreover, when the over-modulation stability is (b) is step S103, the processing proceeds to step S112 and then to step S113 to execute processing similar to the processing described above.

After the over-modulation processing unit 16 executes the processing as described above, the control processing for the electric motor by the control device 1 for the electric motor in the embodiment is terminated.

[Effects of First Embodiment]

As described above in detail, the control device 1 for the electric motor in the embodiment determines whether the electric motor 100 is stable or unstable in the over-modulation state and performs the control. Accordingly, it is possible to improve the usage rate of the power supply voltage at an operation point where the electric motor 100 is stable in the over-modulation state and thereby achieve improvements in efficiency and output of the electric motor. Moreover, since the state where the electric motor is unstable in the over-modulation state can be avoided, a system with a high efficiency can be achieved with the stability secured.

Furthermore, the control device 1 for the electric motor in the embodiment determines the characteristic related to stability in the over-modulation state, on the basis of the inductance values of the current control unit 4 and the inductance values of the electric motor 100. The control device 1 indentifies the stable phase region in which the electric motor 100 is stable in the over-modulation state according to the characteristic, and determines whether the electric motor 100 is stable or unstable in the over-modulation state. Accordingly, it is possible to constantly determine whether the electric motor 100 is stable or unstable by constantly monitoring the inductance values of the electric motor 100 which change depending on the operation point.

Moreover, in the control device 1 for the electric motor in the embodiment, since the voltage phase limiting unit 25 changes the current command value in such a way that the phase α of the voltage command value is in the stable phase region, the electric motor 100 can be set to the stable state without changing the modulation ratio.

Furthermore, in the control device 1 for the electric motor in the embodiment, the current command value changed by the voltage phase limiting unit 25 is the d-axis current command value $i_d^*$ which is a current in the magnetic pole direction. Accordingly, the phase α of the voltage command value can be shifted to the stable phase region by causing the current to flow at such a level that magnetic flux is cancelled out or at a higher level. This can secure stability with the change of the current command value made as small as possible.

Moreover, in the control device 1 for the electric motor in the embodiment, when the modulation ratio of the electric motor 100 is within the preset threshold, the over-modulation suppressor 26 does not perform the processing of suppressing the modulation ratio. Accordingly, it is possible to prevent unnecessary limitations on the operation point and changes of the constants.

Second Embodiment

Next, the second embodiment to which the present invention is applied is described with reference to the drawings. The same parts as those in the first embodiment described above are denoted by the same reference numerals and detailed description thereof is omitted.

[Overall Configuration of Control Device for Electric Motor]

Figure 7:
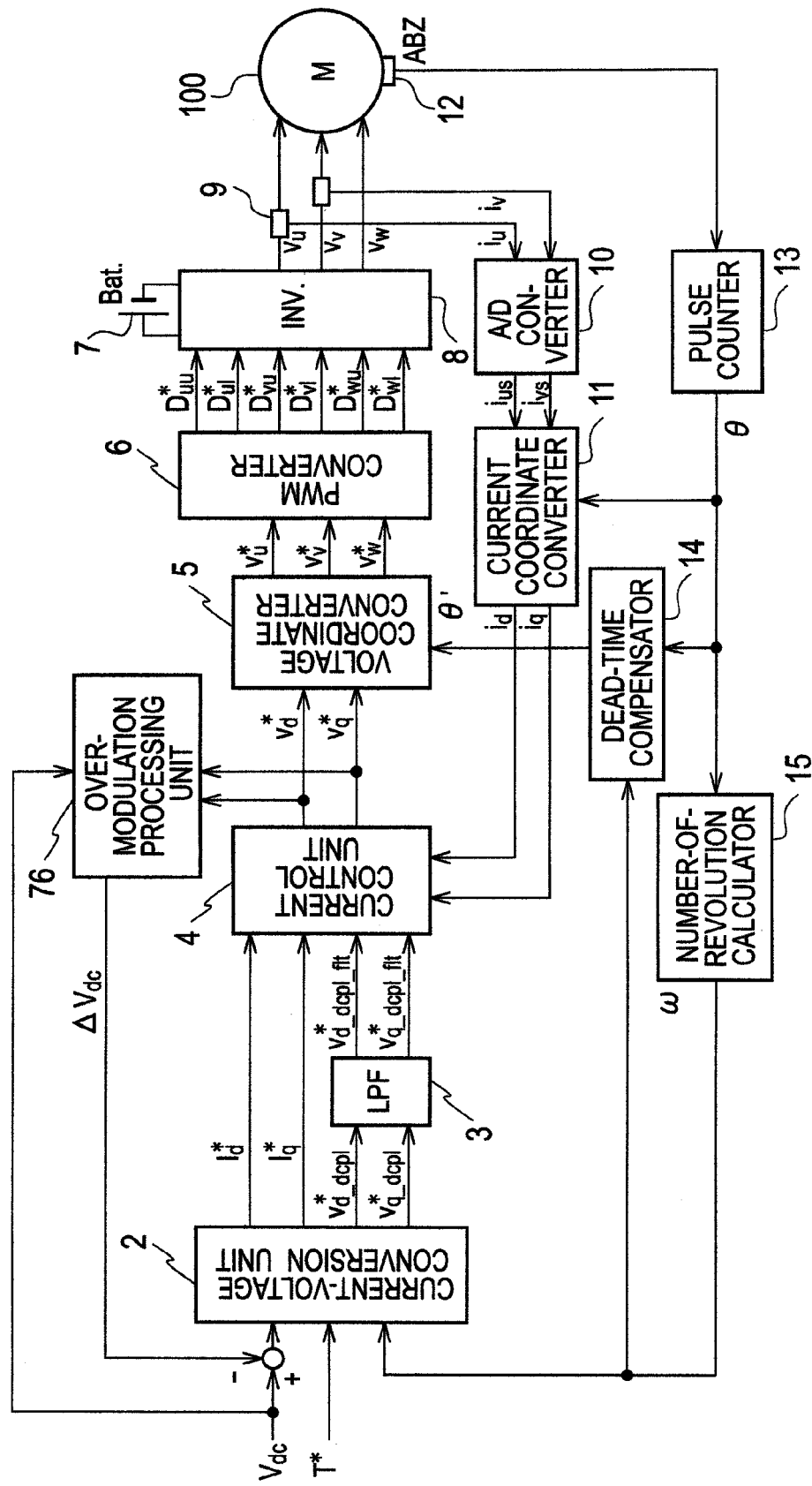
FIG. 7 is a block diagram showing an overall configuration of a control device for an electric motor in a second embodiment to which the present invention is applied.

FIG. 7 is a block diagram showing a configuration of a control device for an electric motor in the embodiment. As shown in FIG. 7, a control device 71 for the electric motor in the embodiment includes the same constitutional elements as those in the control device 1 for the electric motor in the first embodiment which are shown in FIG. 1, but is different in inputs and outputs of an over-modulation processing unit 76.

Although the over-modulation processing unit 16 of the first embodiment shown in FIG. 1 receives the current control constants and the electric motor constants, the over-modulation processing unit 76 of the embodiment receives no current control constants or electric motor constants. Moreover, although the over-modulation processing unit 16 of the first embodiment outputs the correction value $\Delta i_d^*$ for the current command value $i_d^*$, the over-modulation processing unit 76 of the embodiment outputs no correction value $\Delta i_d^*$.

[Configuration of Over-Modulation Processing Unit]

Figure 8:
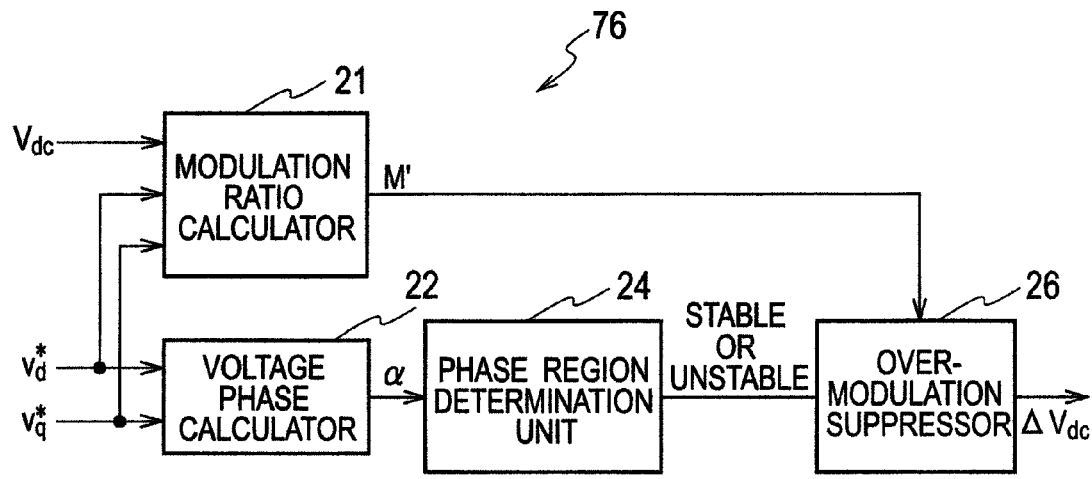
FIG. 8 is a block diagram showing a configuration of an over-modulation processing unit in the second embodiment to which the present invention is applied.

FIG. 8 is a block diagram showing a configuration of the over-modulation processing unit 76 in the embodiment. As shown in FIG. 8, the over-modulation processing unit 76 in the embodiment includes: a modulation ratio calculator 21 configured to calculate a modulation ratio M' of an electric motor 100; a voltage phase calculator 22 configured to calculate a phase α of a voltage command value; a phase region determination unit 24 configured to determine whether the electric motor 100 is stable or unstable in an over-modulation state, on the basis of the phase α of the voltage command value; and an over-modulation suppressor 26 configured to suppress the modulation ratio M' when the electric motor 100 is unstable in the over-modulation state. The over-modulation processing unit 76 includes no over-modulation characteristic determination unit 23 or voltage phase limiting unit 25 shown in FIG. 2.

[Procedure of Control Processing for Electric Motor]

Next, a procedure of control processing for the electric motor performed by the control device 71 for the electric motor in the embodiment is described with reference to the flowchart of FIG. 9.

Figure 9:
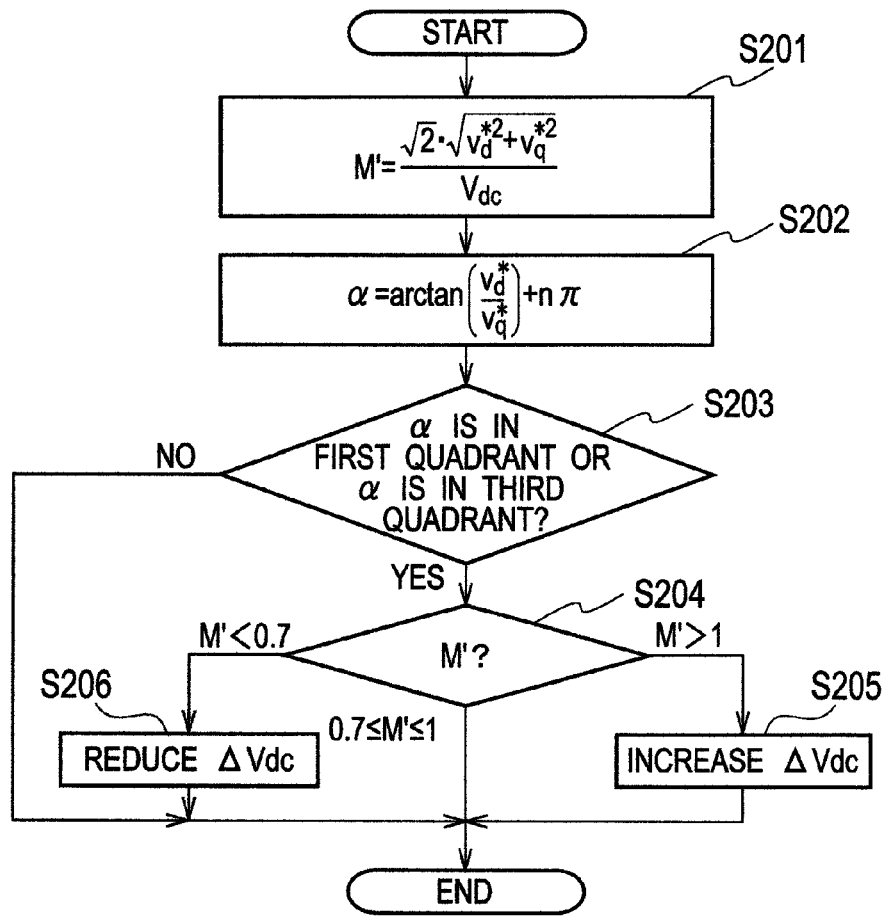
FIG. 9 is a flowchart showing a procedure of control processing for the electric motor performed by the control device for the electric motor in the second embodiment to which the present invention is applied.

As shown in FIG. 9, the modulation ratio calculator 21 calculates the modulation ratio M' of the electric motor 100 in step S201, and the voltage phase calculator 22 calculates the phase α of the voltage command value in step S202. Then, in step S203, the phase region determination unit 24 determines whether the electric motor 100 is stable or unstable in the over-modulation state, on the basis of the phase α of the voltage command value.

A method of determining whether the electric motor 100 is stable or unstable in step S203 is described with reference to FIG. 10. Generally, since current control constants $L_{dc}'$, $L_{qc}'$ are set to coincide with electric motor constants $L_{dp}'$, $L_{qp}'$ on average, inductance ratios are set at a position in a region X around a point [1,1] shown in FIG. 10. However, in the embodiment, the current control constants $L_{dc}'$, $L_{qc}'$ are set such that the inductance ratios are set at a position in a region Y away from the point [1, 1]. Since the over-modulation stability is fixed to be (a) at all operation points by this setting, determination of the type of the over-modulation stability is unnecessary. As a matter of course, the current control constants $L_{dc}'$, $L_{qc}'$ can be set such that the inductance ratios are above a stability boundary and the over-modulation stability is thereby fixed to be (b).

Since the type of the over-modulation stability is fixed in advance in the embodiment as described above, no over-modulation characteristic determination unit 23 is included unlike the first embodiment. In this method, a model error is large. However, a rebound on a current response performance can be reduced to an almost ignorable level by employing a configuration such as a two-degree-of-freedom control configuration in the current control unit 4 and thereby designing the control device to be robust against disturbance.

Since the over-modulation stability is fixed to be (a) in the embodiment as described above, whether the phase α of the voltage command value is in any one of the first quadrant and the third quadrant is determined in step S203. When the phase α is in neither of the quadrants, the electric motor 100 is determined to stable on the basis of FIG. 6(a) and the control processing for the electric motor in the embodiment is terminated.

Meanwhile, when the phase α of the voltage command value is in any one of the first quadrant and the third quadrant in step S203, the electric motor 100 is determined to be unstable on the basis of FIG. 6(a) and the processing proceeds to step S204.

In step S204, whether the modulation ratio M' is larger than a first threshold 1.0 and is smaller than a second threshold 0.7 is determined. When the modulation ratio M' is larger than 1.0, the electric motor 100 is unstable and is in the over-modulation state. Accordingly, in step S205, the over-modulation suppressor 26 increases the correction value $\Delta V_{dc}$ for the voltage detection value $V_{dc}$ and outputs it (Note that $\Delta V_{dc} \geq 0$). As shown in FIG. 7, since the correction value $\Delta V_{dc}$ is subtracted from the voltage detection value $V_{dc}$, the voltage detection value $V_{dc}$ to be inputted to the current-voltage conversion unit 2 is reduced and the modulation ratio M' is thereby reduced. The control processing for the electric motor in the embodiment is then terminated.

Meanwhile, when the modulation ratio M' is equal to or larger than 0.7 and is equal to or smaller than 1.0 in step S204, necessity for correction is small. Accordingly, the control processing for the electric motor in the embodiment is terminated without performing further processing even when the electric motor 100 is unstable.

Furthermore, since the modulation ratio M' is small when the modulation ratio M' is smaller than 0.7 in step S204, the over-modulation suppressor 26 reduces the correction value $\Delta V_{dc}$ for the voltage detection value $V_{dc}$ and outputs it in step S206. Reducing the correction value $\Delta V_{dc}$ increases the voltage detection value $V_{dc}$ to be inputted to the current-voltage conversion unit 2 and the modulation ratio M' is thereby increased. The control processing for the electric motor performed by the control device 71 for the electric motor in the embodiment is then terminated.

Moreover, the over-modulation processing unit 76 in the embodiment includes no voltage phase limiting unit 25 unlike the first embodiment. This is because, when the current-voltage conversion unit 2 calculates the current command value $i_d^*$, the current command value $i_d^*$ is limited in advance.

Specifically, a current-voltage conversion map of the current-voltage conversion unit 2 is preset to enable calculation of such a current command value $i_d*$ that the phase α of the voltage command value including temperature characteristics and variation does not shift to a different quadrant in the same mode (rotating direction, power running or regeneration) and the electric motor 100 thereby does not change from the stable state to the unstable state.

Accordingly, the over-modulation processing unit 76 in the embodiment can maintain the phase α of the voltage command value in the region where the electric motor 100 is stable, without the voltage phase limiting unit 25. Moreover, even if the phase α of the voltage command value moves out of an assumed range and shifts to an unstable phase region, the over-modulation state can be avoided by using the phase region determination unit 24 and the over-modulation suppressor 26.

[Effects of Second Embodiment]

As described above in detail, the control device 71 for the electric motor in the second embodiment to which the present invention is applied determines whether the electric motor 100 is stable or unstable in the over-modulation state, on the basis of the phase α of the voltage command value. Accordingly, it is possible to accurately determine the stability in the over-modulation state in a simpler method by monitoring only the phase α of the voltage command value.

Furthermore, the control device 71 for the electric motor in the embodiment determines whether the electric motor 100 is stable or unstable in the over-modulation state by using such a characteristic that the state of the electric motor 100 changes to the stable state or the unstable state every time the phase α of the voltage command value moves to a different quadrant on a coordinate system defined in a magnetic pole direction and a direction orthogonal to the magnetic pole direction. Accordingly, it is possible to accurately determine the stability in the over-modulation state by monitoring the phase α of the voltage command value.

Moreover, in the control device 71 for the electric motor in the embodiment, the inductance values of the current control unit 4 and the inductance values of the electric motor 100 are preset in such a way that the type of the characteristic related to the stability in the over-modulation state is constant. Accordingly, it is possible to determine the stability in the over-modulation state by monitoring only the phase α of the voltage command value. Moreover, the phase α of the voltage command value which is a boundary between regeneration and power running and the phase α of the voltage command value which is a boundary between the stable state and the unstable state almost coincide with each other. Thus, an operation region (power running in a case of an electric motor, regeneration in a case of a power generator) to be emphasized can be selected to be made stable in the over modulation and an optimum design according to intended use is made possible.

Furthermore, the control device 71 for the electric motor in the embodiment calculates the current command value $i_d*$ on the basis of the preset current-voltage conversion map, and the current-voltage conversion map is preset to enable calculation of such a current command value $i_d*$ that the phase α of the voltage command value does not move to a different quadrant. Accordingly, the over-modulation state can be made stable without correcting the current command value $i_d*$ in the operation of the electric motor 100.

Third Embodiment

Next, the third embodiment to which the present invention is applied is described with reference to the drawings. The same parts as those in the first and second embodiments described above are denoted by the same reference numerals and detailed description thereof is omitted.

[Overall Configuration of Control Device for Electric Motor]

Figure 11:
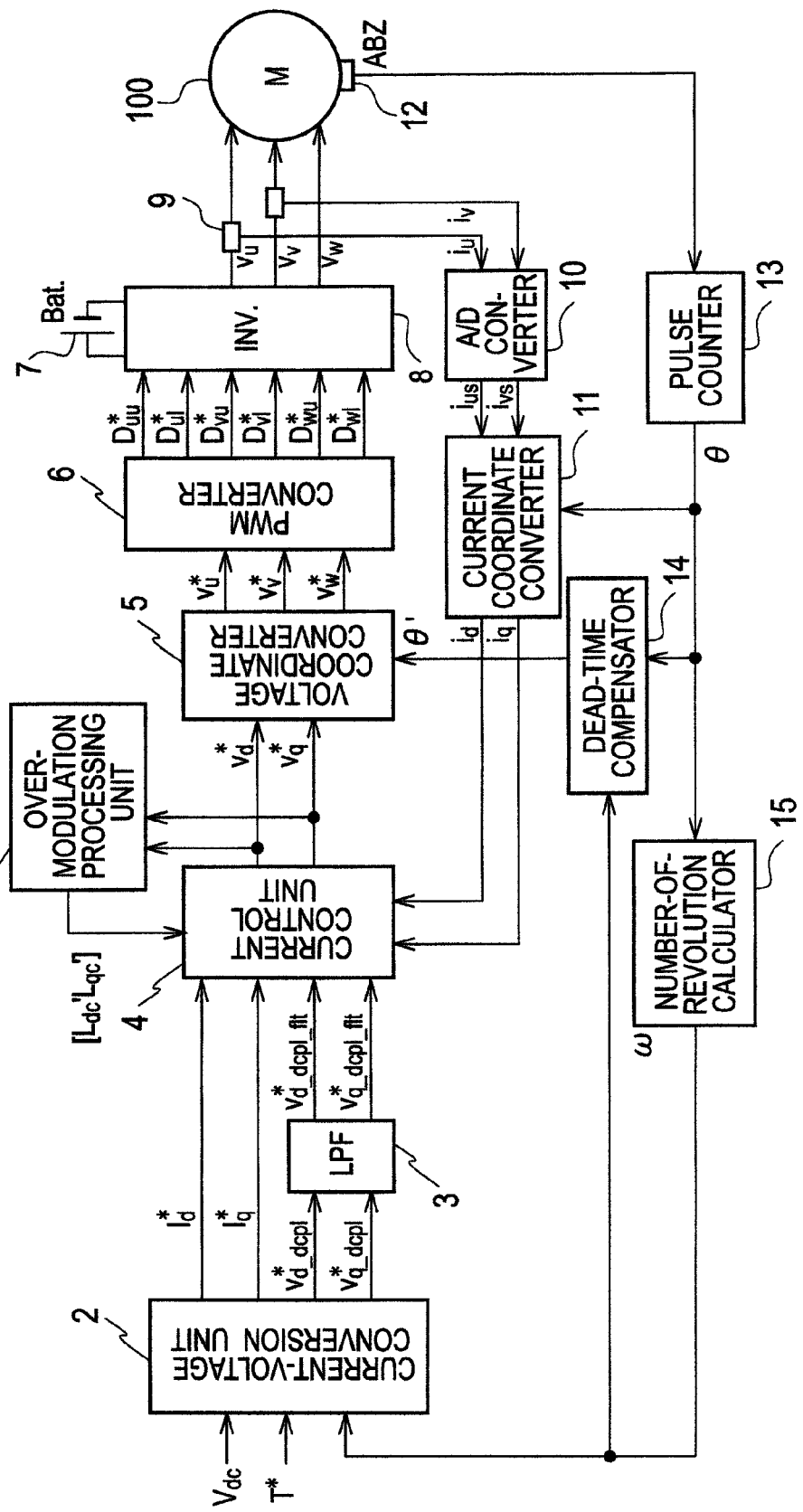
FIG. 11 is a block diagram showing an overall configuration of a control device for an electric motor in a third embodiment to which the present invention is applied.

FIG. 11 is a block diagram showing a configuration of a control device for an electric motor in the embodiment. As shown in FIG. 11, a control device 111 for the electric motor in the embodiment includes the same constitutional elements as those in the control device 1 for the electric motor in the first embodiment which are shown in FIG. 1, but is different in inputs and outputs of an over-modulation processing unit 116. The over-modulation processing unit 116 of the embodiment receives only voltage command values $v_d*$, $v_q*$ and outputs current control constants $L_{dc}'$, $L_{qc}'$ as outputs.

[Configuration of Over-Modulation Processing Unit]

Figure 12:
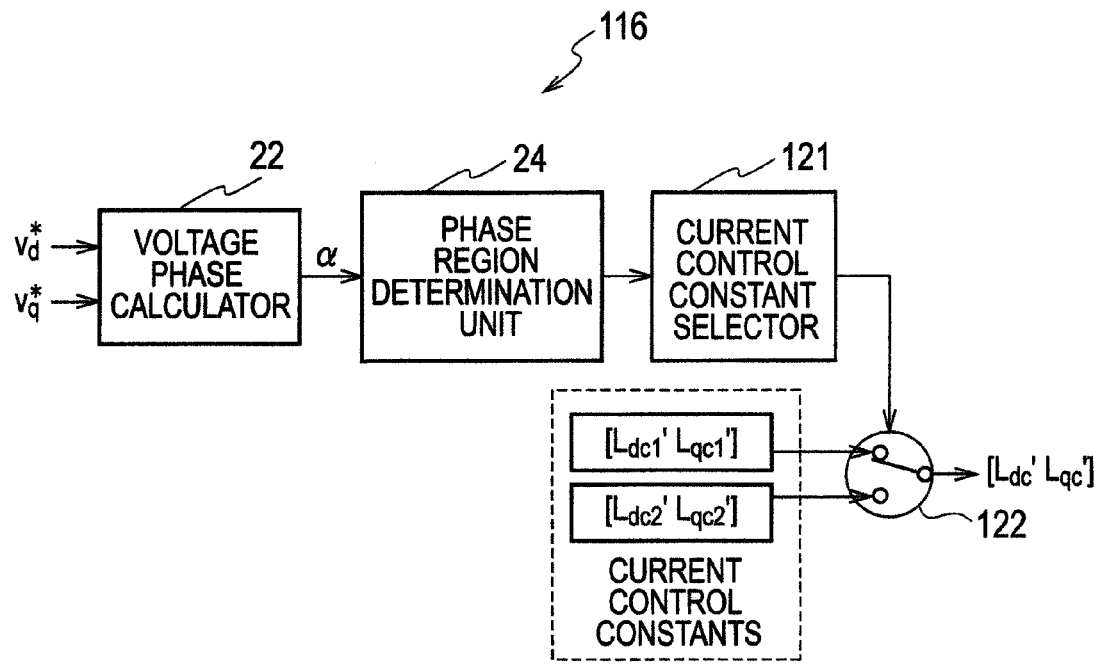
FIG. 12 is a block diagram showing a configuration of an over-modulation processing unit in the third embodiment to which the present invention is applied.

FIG. 12 is a block diagram showing a configuration of the over-modulation processing unit 116 in the embodiment. As shown in FIG. 12, the over-modulation processing unit 116 in the embodiment includes: a voltage phase calculator 22 configured to calculate a phase α of a voltage command value; a phase region determination unit 24 configured to determine in which quadrant the phase α of the voltage command value exists; a current control constant selector 121 configured to select a set of current control constants stored for each of multiple types of over-modulation stability; and a selector 122 configured to perform switching of the set of the current control constants according to a command from the current control constant selector 121.

Figure 13:
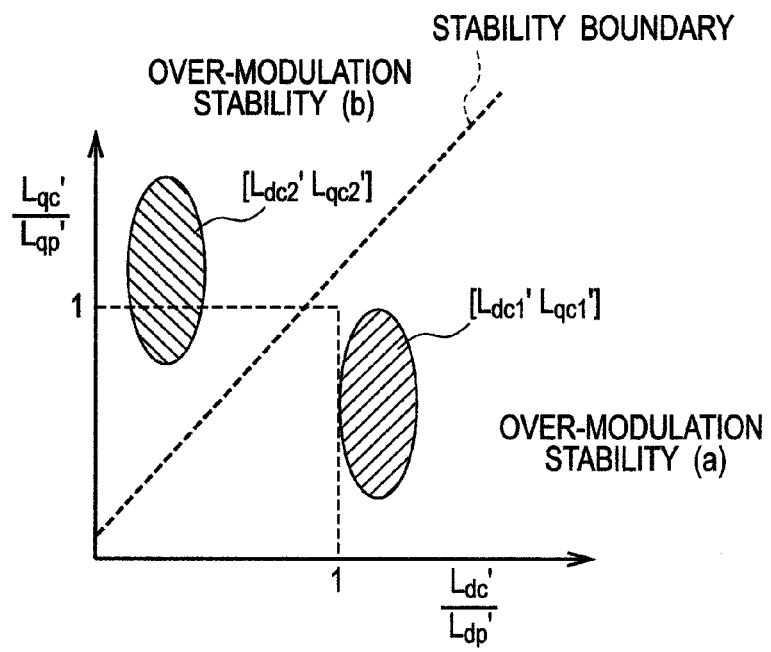
FIG. 13 is a graph for explaining current control constants in the control device for the electric motor in the third embodiment to which the present invention is applied.

Here, the current control constant selector 121 stores a set of current control constants always distributed on one side of a stability boundary at any operations point as shown in FIG. 13 for each of types (a) and (b) of over-modulation stability, and always selects and uses either one of the sets of current control constants. For example, in FIG. 13, the current control constant selector 121 selects and uses a set of current control constants $L_{dc1}'$, $L_{qc1}'$ when the over-modulation stability is (a) and selects and uses a set of current control constants $L_{dc2}'$, $L_{qc2}'$ when the over-modulation stability is (b).

[Procedure of Control Processing for Electric Motor]

Next, a procedure of control processing for the electric motor performed by the control device 111 for the electric motor in the embodiment is described with reference to the flowchart of FIG. 14.

As shown in FIG. 14, in step 301, the voltage phase calculator 22 calculates the phase α of the voltage command value. Then, in step S302, the phase region determination unit 24 determines whether the phase α of the voltage command value is in any one of the first quadrant and the third quadrant. When the phase α is not in neither of the quadrants, the processing proceeds to step S303.

When the phase α of the voltage command value is in neither the first quadrant nor the third quadrant, i.e. in the second quadrant or the fourth quadrant, referring to FIG. 6, the electric motor 100 is stable in an over-modulation state in the over-modulation stability (a). Accordingly, in step S303, the current control constant selector 121 selects the set of current control constants $L_{dc1}'$, $L_{qc1}'$ for the over-modulation stability (a).

Meanwhile, when the phase α of the voltage command value is in the first quadrant or the third quadrant in step S302, the processing proceeds to step S304.

When the phase α of the voltage command value is in the first quadrant or the third quadrant, referring to FIG. 6, the electric motor 100 is stable in the over-modulation state in the over-modulation stability (b). Accordingly, in step S304, the current control constant selector 121 selects the set of current control constants $L_{dc2}'$, $L_{qc2}'$ for the over-modulation stability (b).

When either one of the sets of current control constants is selected, the selector 122 performs switching of the set of the current control constants in step S305. Thus, as shown in FIG. 15, a new set of current control constants is inputted into a current controller included in a current control unit 4 and is thereby reflected. Then the control processing for the electric motor in the embodiment is terminated.

[Effects of Third Embodiment]

As described above in detail, the control device 111 for the electric motor in the third embodiment to which the present invention is applied stores the set of current control constants (inductance values of the current control unit 4) for each of the multiple characteristics related to the stability in the over-modulation state, and selects one of the sets of current control constants according to the phase α of the voltage command value. Accordingly, the electric motor 100 can be stably driven with no limitations on operations and operating conditions of the electric motor 100 in the over-modulation state.

Fourth Embodiment

Next, the fourth embodiment to which the present invention is applied is described with reference to the drawings. The same parts as those in the first embodiment described above are denoted by the same reference numerals and detailed description thereof is omitted.

[Overall Configuration of Control Device for Electric Motor]

Figure 16:
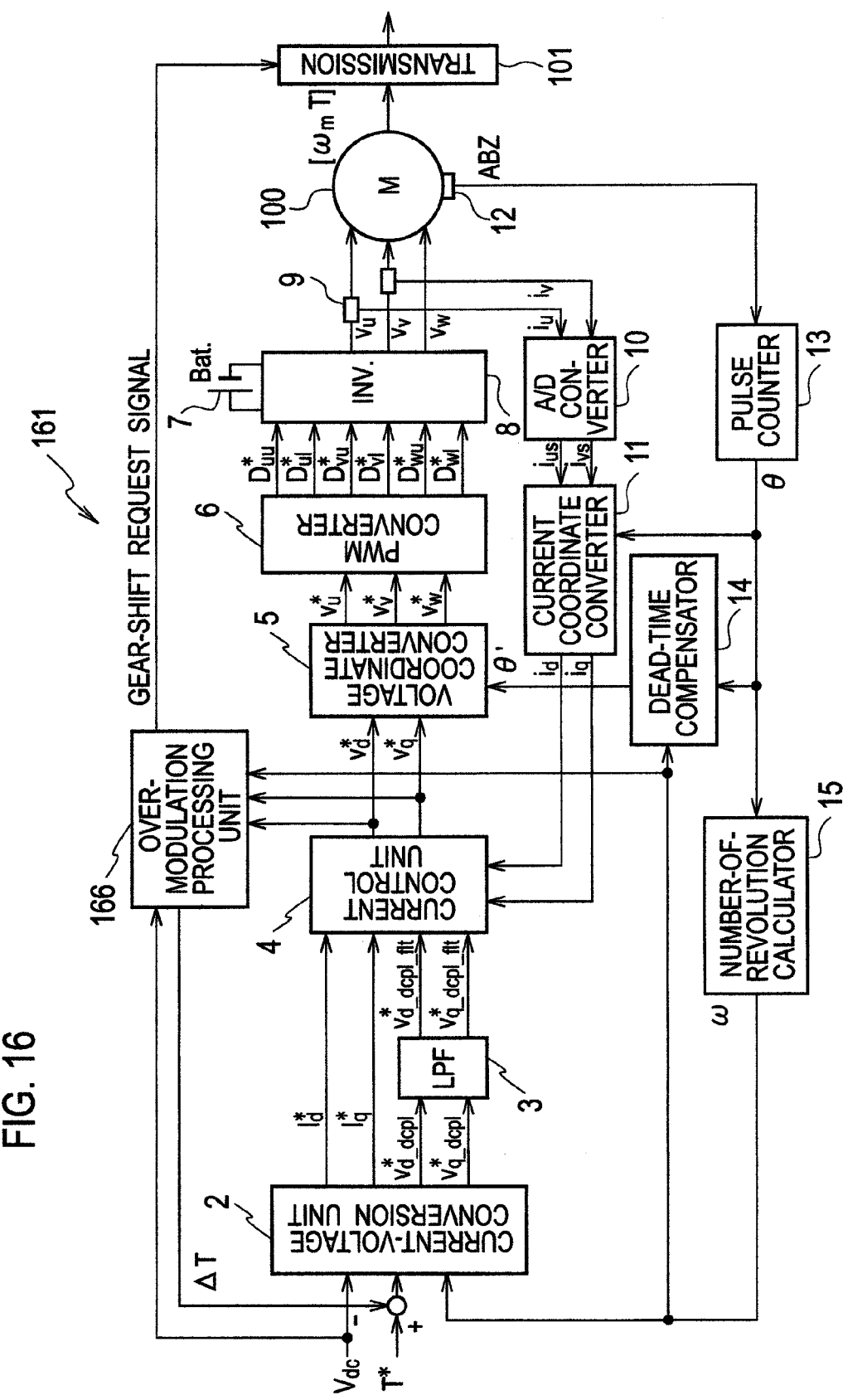
FIG. 16 is a block diagram showing an overall configuration of a control device for an electric motor in a fourth embodiment to which the present invention is applied.

FIG. 16 is a block diagram showing a configuration of a control device for an electric motor in the embodiment. As shown in FIG. 16, a control device 161 for the electric motor in the embodiment includes the same constitutional elements as those in the control device 1 for the electric motor in the first embodiment which are shown in FIG. 1. However, a transmission 101 is connected to an output of an electric motor 100.

Moreover, an over-modulation processing unit 166 in the embodiment is different from the over-modulation processing unit 16 of the first embodiment shown in FIG. 1 in inputs and outputs. The over-modulation processing unit 166 in the embodiment receives an electric angular velocity ω in addition to d and q-axis voltage command values $v_d{}^*$, $v_q{}^*$ and a voltage detection value $V_{dc}$. Moreover, a correction value ΔT for a torque command value T* and a gear-shift request signal are outputted from the over-modulation processing unit 166 in the embodiment.

Figure 10:
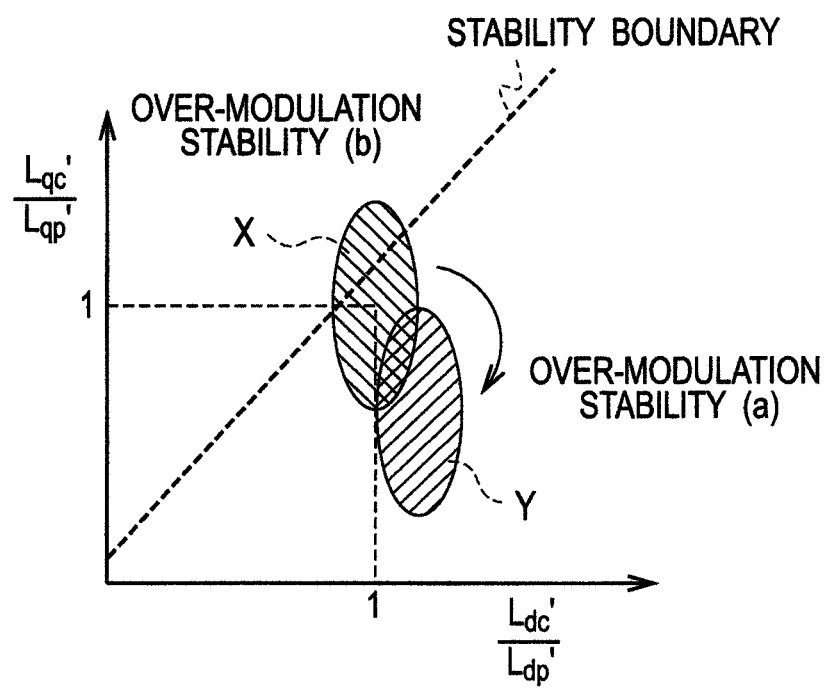
FIG. 10 is a graph for explaining over-modulation stability in the control device for the electric motor in the second embodiment to which the present invention is applied.

In the embodiment, current control constants and electric motor constants are preset in such a way that over-modulation stability is always (a) as described in FIG. 10 of the second embodiment. However, the over-modulation stability may be set to (b) instead of (a).

[Configuration of Over-Modulation Processing Unit]

Figure 17:
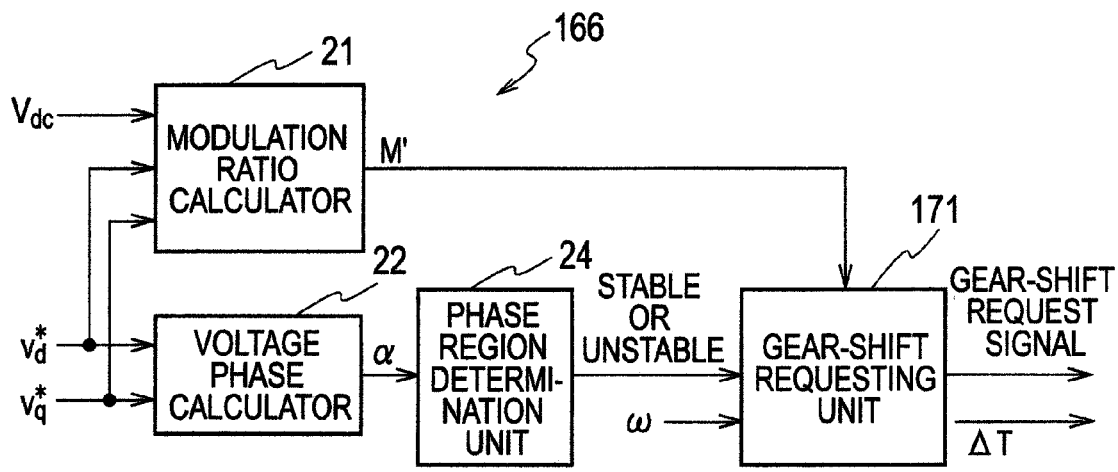
FIG. 17 is a block diagram showing a configuration of an over-modulation processing unit in the fourth embodiment to which the present invention is applied.

FIG. 17 is a block diagram showing a configuration of the over-modulation processing unit 166 in the embodiment. As shown in FIG. 17, the over-modulation processing unit 166 in the embodiment includes: a modulation ratio calculator 21 configured to calculate a modulation ratio M' of the electric motor 100; a voltage phase calculator 22 configured to calculate a phase α of the voltage command value; a phase region determination unit 24 configured to determine whether the electric motor 100 is stable or unstable in an over-modulation state, on the basis of the phase α of the voltage command value; and a gear-shift requesting unit 171 configured to output the correction value ΔT for the torque command value T* and the gear-shift request signal in such a way that the electric motor 100 becomes stable in the over-modulation state by the gear-shifting of the transmission 101.

When the electric motor 100 is unstable in the over-modulation state, the over-modulation processing unit 166 in the embodiment described above causes the transmission 101 to perform gear-shifting and thereby moves the phase α of the voltage command value to a phase region in which the electric motor 100 is stable in the over-modulation state.

[Procedure of Control Processing for Electric Motor]

Next, a procedure of control processing for the electric motor performed by the control device 161 for the electric motor in the embodiment is described with reference to the flowchart of FIG. 18.

Figure 18:
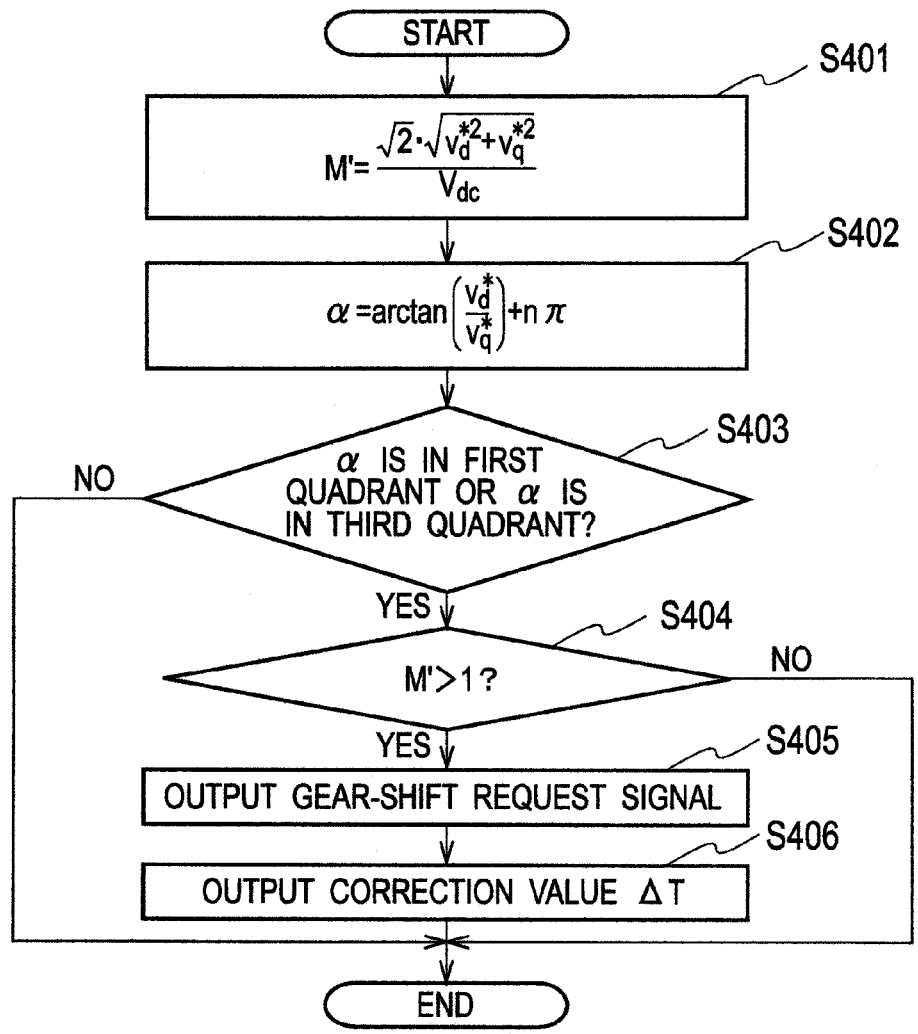
FIG. 18 is a flowchart showing a procedure of control processing for the electric motor performed by the control device for the electric motor in the fourth embodiment to which the present invention is applied.

As shown in FIG. 18, the modulation ratio calculator 21 calculates the modulation ratio M' of the voltage command value in step S401, and the voltage phase calculator 22 calculates the phase α of the voltage command value in step S402. Then, in step S403, the phase region determination unit 24 determines whether the electric motor 100 is stable or unstable in the over-modulation state, on the basis of the phase α of the voltage command value. Since the over-modulation stability is fixed to (a) in the embodiment, the phase region determination unit 24 determines whether the phase α of the voltage command value is in any one of the first quadrant and the third quadrant in step S403. When the phase α is in neither of the quadrants, the electric motor 100 is determined to be stable as shown in FIG. 6 and the control processing for the electric motor in the embodiment is terminated.

Meanwhile, when the phase α of the voltage command value is in any one of the first quadrant and the third quadrant in step S403, the electric motor 100 is determined to be unstable as shown in FIG. 6 and the processing proceeds to step S404.

In step S404, the gear-shift requesting unit 171 determines whether the modulation ratio M' is larger than a first threshold 1.0. Since the modulation ratio M' is not high when the modulation ratio M' is equal to or smaller than 1.0, the control processing for the electric motor in the embodiment is terminated without performing further processing even when the electric motor 100 is unstable.

Meanwhile, when the modulation ratio M' is larger than 1.0 in step S404, the electric motor 100 is unstable and is in the over-modulation state. Accordingly, in step S405, the gear-shift requesting unit 171 outputs the gear-shift request signal. Then, in step S406, the gear-shift requesting unit 171 calculates the correction value ΔT for the torque command value T* from the electric angular velocity ω and the torque command value T* on the basis of formula (6), and outputs correction value ΔT to maintain a constant output P* of the transmission 101 before and after the gear shift.

[Math 5]

$$\Delta T = \left(\frac{P^*}{\omega} \times \text{number of pairs poles}\right) - T^* \qquad (6)$$

Figure 19:
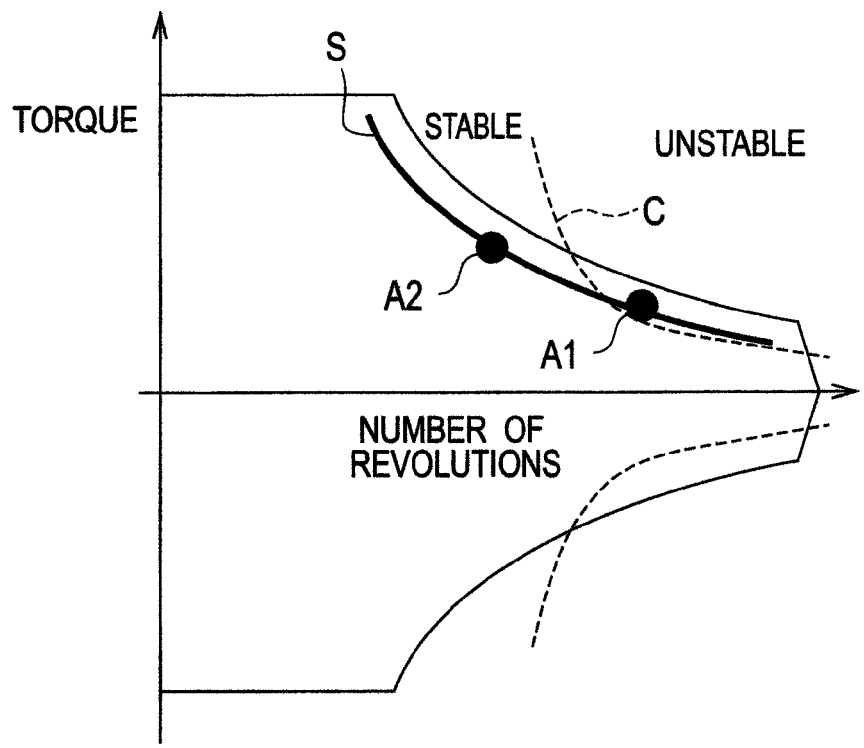
FIG. 19 is a graph for explaining a control method for a stable or unstable state in the control device for the electric motor in the fourth embodiment to which the present invention is applied.

Here, description is given of a method of determining the gear-shift request signal outputted by the gear-shift requesting unit 171. FIG. 19 is a graph showing a relationship between the torque and the number of revolutions of the electric motor 100 and shows two operation points A1, A2 on an even output line S and a voltage quadrant changing line C. In FIG. 19, the voltage quadrant changing line C shows positions where the quadrant of the phase α of the voltage command value changes. The quadrant of the phase α of the voltage command value changes even in the same operation mode (rotating direction, power running or regeneration) when, in particular, a d-axis current is not limited. For example, assume that an upper right side of the voltage quadrant changing line C is the first quadrant shown in FIG. 6(a) in which the electric motor 100 is unstable and a lower left side of the voltage quadrant changing line C is the second quadrant shown in FIG. 6(a) in which the electric motor 100 is stable. In this case, since the electric motor 100 is unstable at the operation point A1, the operation point is moved to the operation point A2 with the output of the electric motor 100 maintained constant, by causing the transmission 101 to perform gear-shift and by outputting the correction value ΔT. Hence, the phase α of the voltage command value moves to the second quadrant in which the electric motor 100 is stable, and the electric motor 100 is thereby stable even in the over-modulation state.

Accordingly, the electric motor 100 can be constantly set in the stable state even in the over-modulation state by selectively changed among the multiple operation points.

Figure 20:
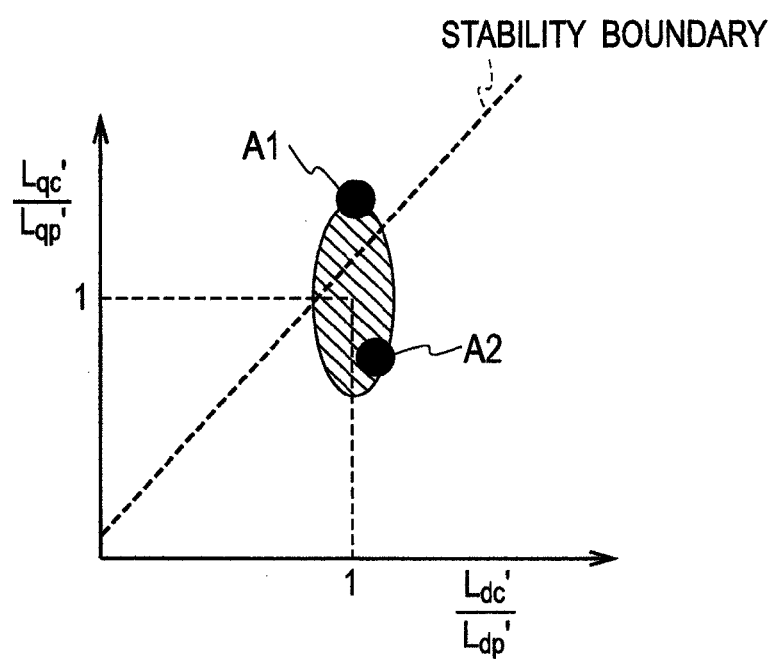
FIG. 20 is a graph for explaining the control method for the stable or unstable state in the control device for the electric motor in the fourth embodiment to which the present invention is applied.
Figure 21:
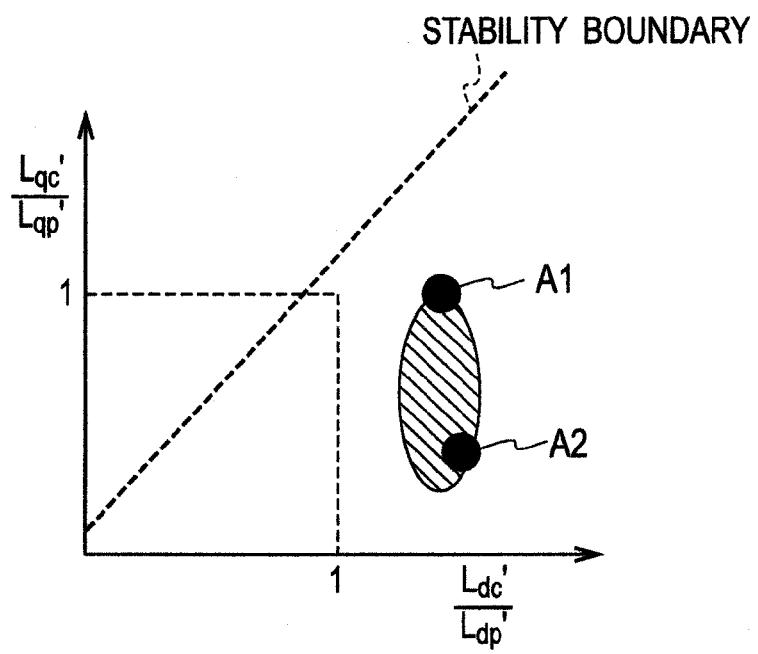
FIG. 21 is a graph for explaining the control method for the stable or unstable state in the control device for the electric motor in the fourth embodiment to which the present invention is applied.

However, when the operation point is changed from the operation point A1 where the over-modulation stability is (b) to the operation point A2 where the over-modulation stability is (a) as shown in FIG. 20, such a solution that the electric motor 100 is stable in the over-modulation state cannot be obtained on the even output line in some cases. Hence, in the embodiment, as shown in FIG. 21, the values of the current control constants and the electric motor constants are preset in such a way that the inductance ratios are distributed on one side of the stability boundary and the over-modulation stability is thus always (a). Note that, when there is no transmission 101 and the electric motor 100 is used as a power generator, the operation point can be simply changed according to a requested output (power generation amount) P*, along the even output line S (a regeneration side in the case of the power generator) shown in FIG. 19.

Figure 22:
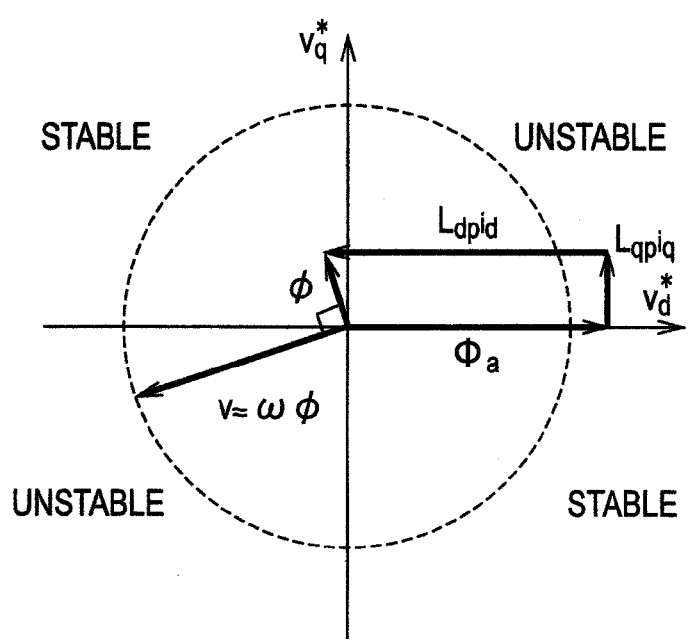
FIG. 22 is a graph for explaining the control method for the stable or unstable state in the control device for the electric motor in the fourth embodiment to which the present invention is applied.

Moreover, the quadrant of the phase α of the voltage command value can be also changed by reversing the torque direction and the rotating direction. Thus, the transmission 101 can be used as a drive force transmission mechanism for simply switching a drive force transmission direction. For example, as shown in FIG. 22, when a voltage command value vector v is in the third quadrant in which the electric motor 100 is unstable in the over-modulation state, the drive force transmission direction of the transmission 101 is switched and the rotating direction of the electric motor 100 is reversed to switch a usage region of the electric motor 100 from the forward power running to the reverse power running, or from the forward regeneration to the reverse regeneration.

Figure 23:
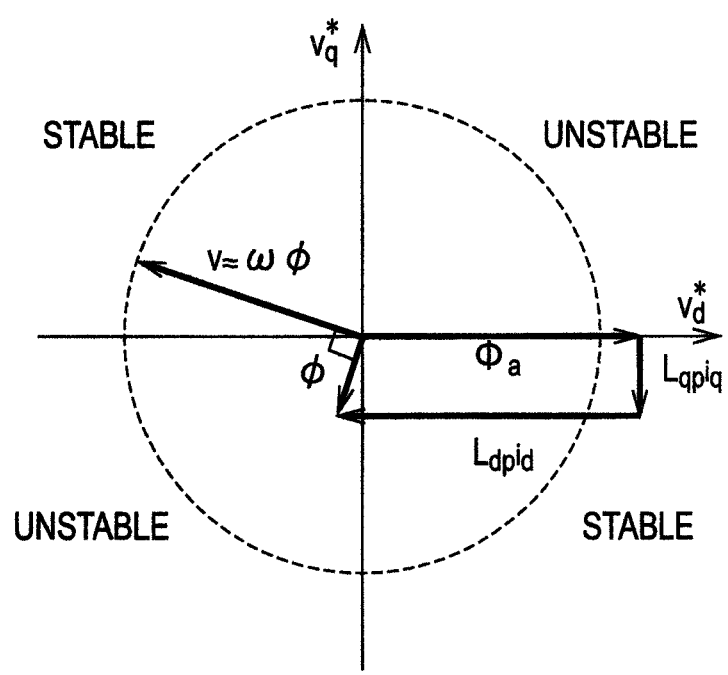
FIG. 23 is a graph for explaining the control method for the stable or unstable state in the control device for the electric motor in the fourth embodiment to which the present invention is applied.

As a result, as shown in FIG. 23, the voltage command value vector v moves to the second quadrant in which the electric motor 100 is stable in the over-modulation state. Accordingly, the electric motor 100 can be driven at an operation point where the electric motor 100 is stable in the over-modulation state.

After the gear-shift of the transmission 101 is performed by outputting the gear-shift request signal and the output of the electric motor 100 is controlled by outputting the correction value ΔT for the torque command value T* as described above, the control processing for the electric motor in the embodiment is terminated.

[Effects of Fourth Embodiment]

As described above in detail, the control device 161 for the electric motor in the fourth embodiment to which the present invention is applied moves the phase α of the voltage command value to a phase region in which the electric motor 100 is stable in the over-modulation state by causing the transmission 101 to perform gear-shift when the electric motor 100 is unstable in the over-modulation state. Hence, an operation point at which the electric motor 100 becomes stable in the over-modulation state can be selected while maintaining a certain level of output of the transmission 101. This increases the number of the operation points where the electric motor 100 can be driven in the over-modulation state and can thereby contribute to improvements in efficiency and output.

Moreover, in the control device 161 for the electric motor in the fourth embodiment to which the present invention is applied, the electric motor 100 is connected to the drive force transmission mechanism and the phase α of the voltage command value is moved to a phase region in which the electric motor 100 is stable in the over-modulation state by switching the transmission direction of the drive force when the electric motor 100 is unstable in the over-modulation state. Accordingly, an operation point where the electric motor 100 is stable in the over-modulation state can be selected while maintaining a certain level of output of the drive force transmission mechanism. This increases the number of the operation points where the electric motor 100 can be driven in the over-modulation state and can thereby contribute to improvements in efficiency and output.

Furthermore, in the control device 161 for the electric motor in the fourth embodiment to which the present invention is applied, when the electric motor 100 is a power generator and the power generator is unstable in the over-modulation state, the phase α of the voltage command value is moved to a phase region in which the power generator is stable in the over-modulation state by moving the operation point along the even output line of the relationship between the power generation amount and the number of revolutions of the power generator. Hence, an operation point in which the power generator is stable can be selected while maintaining a requested power generation amount.

Fifth Embodiment

Next, the fifth embodiment to which the present invention is applied is described with reference to the drawings. The same parts as those in the first embodiment described above are denoted by the same reference numerals and detailed description thereof is omitted.

[Overall Configuration of Control Device for Electric Motor]

Figure 24:
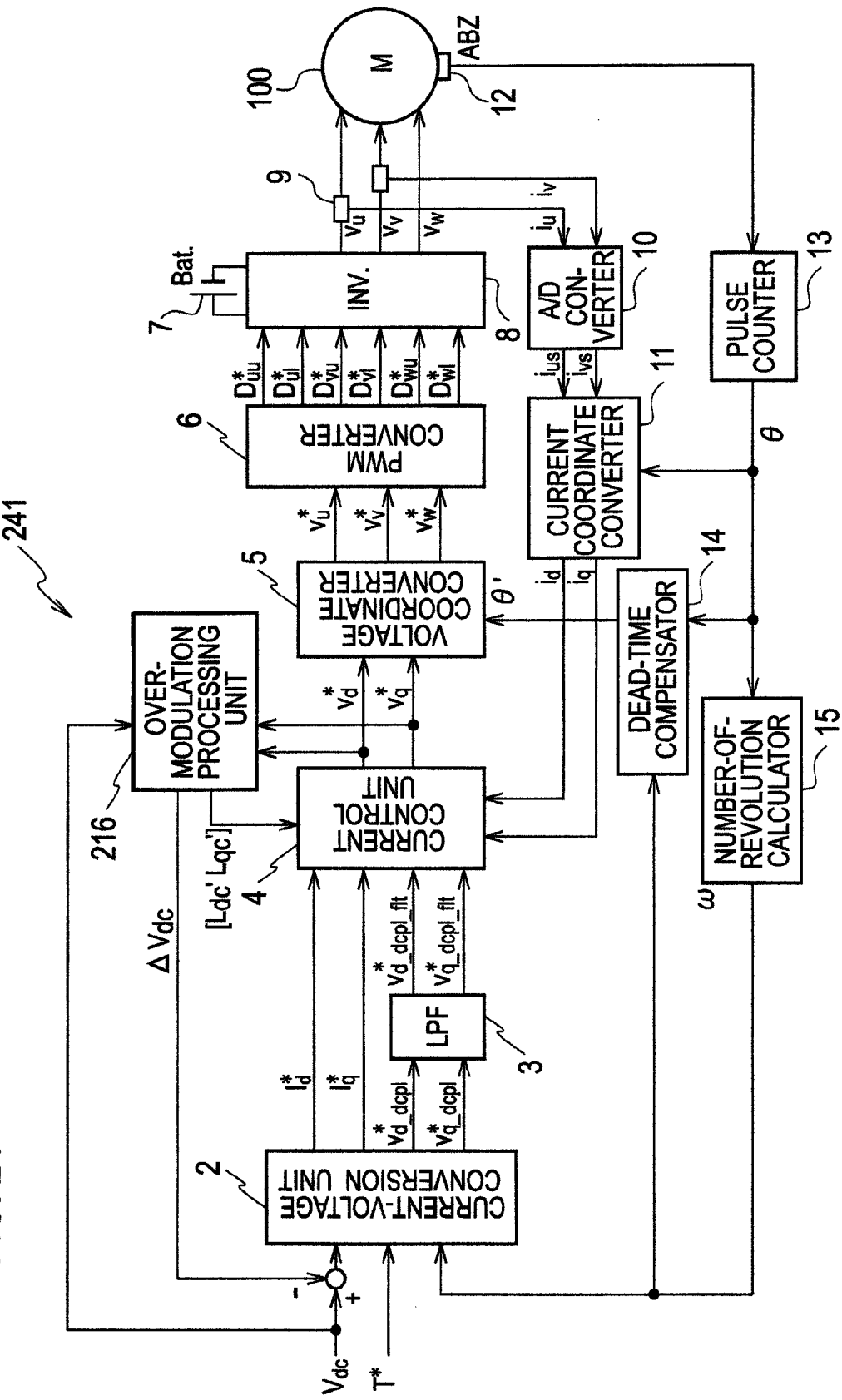
FIG. 24 is a block diagram showing an overall configuration of a control device for an electric motor in a fifth embodiment to which the present invention is applied.

FIG. 24 is a block diagram showing an overall configuration of a control device for an electric motor in the embodiment. As shown in FIG. 24, a control device 241 for the electric motor in the embodiment includes the same constitutional elements as those in the control device 1 for the electric motor in the first embodiment which are shown in FIG. 1, but is different in inputs and outputs of an over-modulation processing unit 216.

The over-modulation processing unit 216 in the embodiment acquires d and q-axis voltage command values $v_d^*$, $v_q^*$ and a voltage detection value $V_{dc}$ of a DC power source 7 and then selects and outputs current control constants at which an electric motor 100 is stable in an over-modulation state. Moreover, the over-modulation processing unit 216 outputs a correction value $\Delta V_{dc}$ for correcting the voltage detection value $V_{dc}$ of the DC power source 7.

[Configuration of Over-Modulation Processing Unit]

Figure 25:
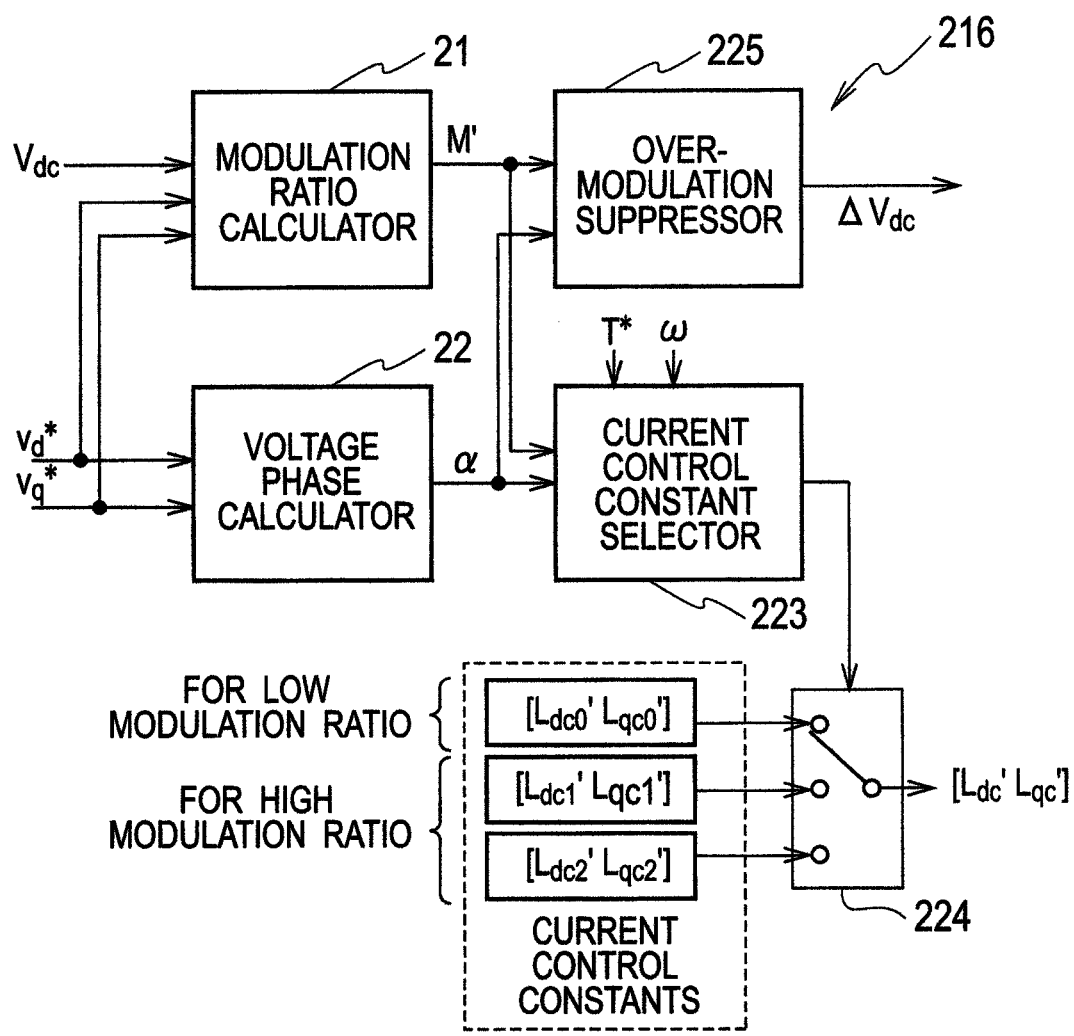
FIG. 25 is a block diagram showing a configuration of an over-modulation processing unit in the fifth embodiment to which the present invention is applied.

FIG. 25 is a block diagram showing a configuration of the over-modulation processing unit 216 in the embodiment.

As shown in FIG. 25, the over-modulation processing unit 216 in the embodiment includes: a modulation ratio calculator 21 configured to calculate a modulation ratio M' of the electric motor 100; a voltage phase calculator 22 configured to calculate a phase α of a voltage command value; a current control constant selector 223 configured to select a set of current control constants at which the electric motor 100 is stable in the over-modulation state, from sets of current control constants stored in advance; a selector 224 configured to switch the current control constant according to a command from the current control constant selector 223; and an over-modulation suppressor 225 configured to suppress the modulation ratio M' of the electric motor 100 to a value equal to or smaller than a preset upper limit of the modulation ratio.

Here, the current control constant selector 223 selects one of a set of current control constants $L_{dc0}'$, $L_{qc0}'$ for a low modulation ratio and sets of current control constants $L_{dc1}'$, $L_{qc1}'$, and $L_{dc2}'$, $L_{qc2}'$ for a high modulation ratio which are stored in advance, on the basis of the phase α of the voltage command value. The selection result is sent to the selector 224 and the selector 224 selects the one set of the current control constants and outputs the selected set to a current control unit 4.

The over-modulation suppressor 225 changes the correction value $\Delta V_{dc}$ for the voltage detection value $V_{dc}$ of the DC power source 7 in such a way that the modulation ratio M' becomes equal to or smaller than the upper limit of the modulation ratio which is set according to the phase α of the voltage command value, and thereby suppresses the modulation ratio M.

Figure 26:
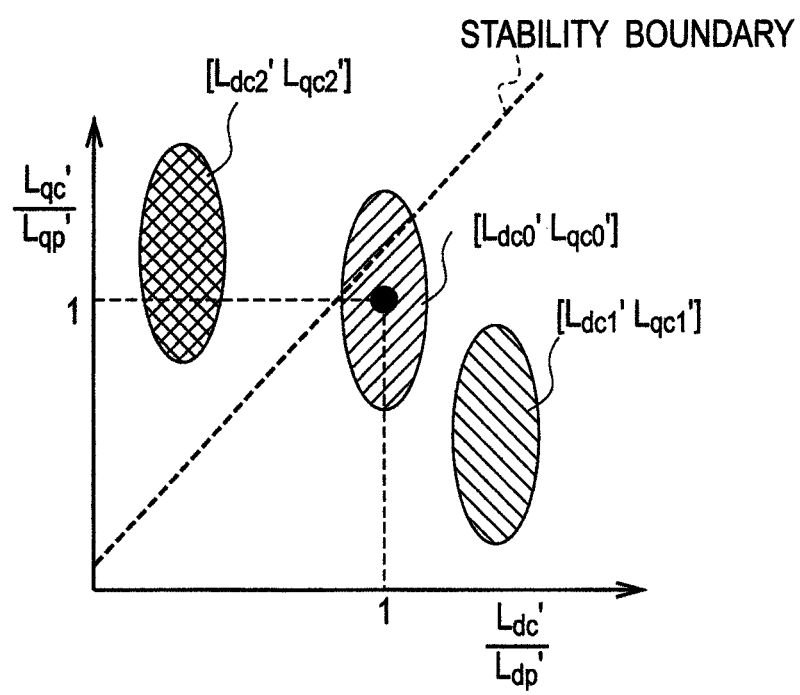
FIG. 26 is a graph for explaining current control constants in the control device for the electric motor in the fifth embodiment to which the present invention is applied.

As shown in FIG. 26, the over-modulation processing unit 216 in the embodiment stores the set of current control constants $L_{dc1}'$, $L_{qc1}'$ for over-modulation stability (a), the set of current control constants $L_{dc2}'$, $L_{qc2}'$ for the over-modulation stability (b), and the set of current control constants $L_{dc0}'$, $L_{qc0}'$ corresponding to a position to be a boundary of the over-modulation stability, and always selects and uses one of the sets of the current control constants. The current control constants $L_{dc1}'$, $L_{qc1}'$ or $L_{dc2}'$, $L_{qc2}'$ for the over-modulation stability (a) or (b) are inductance values always distributed on one side of the stability boundary at any operation point, and are used in the high modulation ratio. Moreover, the current control constants $L_{dc0}'$, $L_{qc0}'$ corresponding to the position to be the boundary of the over-modulation stability are inductance values targeting at a point where $L_{qc}'/L_{qp}':L_{dc}'/L_{dp}'$ is 1:1, and are used in the low modulation ratio.

When one of the sets of the current control constants described above is selected and outputted by the current control constant selector 223 and the selector 224, the one set of the current control constants is reflected in a current controller included in the current control unit 4 as shown in FIG. 15.

Moreover, the phase α of the voltage command value calculated by the voltage phase calculator 22 includes various sensor errors and errors due to variation of objects and the like. Hence, when the set of current control constants is switched based on the value of the phase α, the electric motor 100 may become unstable in the over-modulation state for an instant. Furthermore, when boundaries of quadrants of the phase α of the voltage command value are used as thresholds for switching the set of current control constants, chattering may occur.

Figure 27:
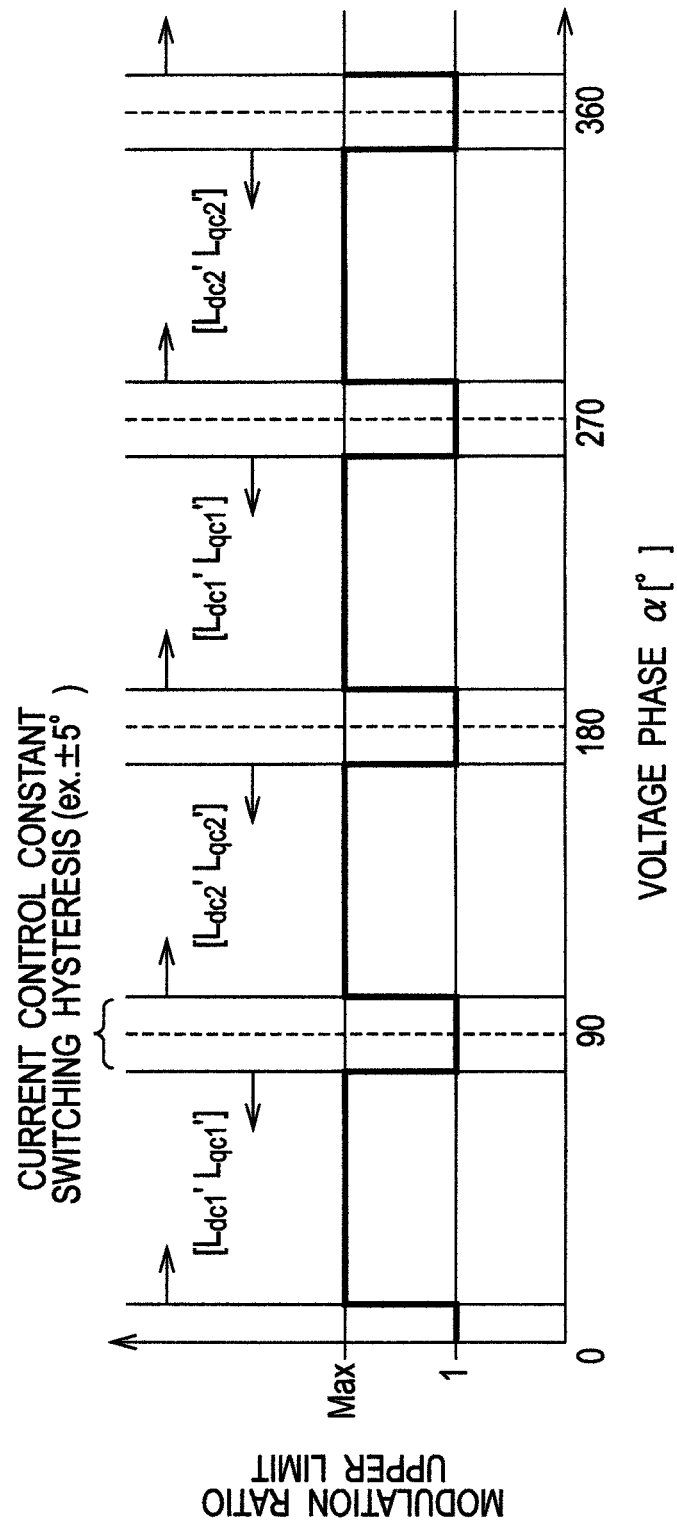
FIG. 27 is a graph for explaining a relationship between a modulation ratio and a phase of a voltage command value in the control device for the electric motor in the fifth embodiment to which the present invention is applied.

In this respect, as shown in FIG. 27, the current control constant selector 223 has hysteresis for the thresholds for switching the set of current control constants and the over-modulation suppressor 225 reduces the upper limit of the modulation ratio M' in hysteresis sections. Specifically, the over-modulation suppressor 225 reduces and limits the upper limit of the modulation ratio from a value of Max to 1, near (for example, ±5°) 90°, 180°, 270°, and 360° which are the boundaries of quadrants.

[Procedure of Control Processing for Electric Motor]

Next, a procedure of control processing for the electric motor performed by the control device 1 for the electric motor in the embodiment is described with reference to the flowchart of FIG. 28.

Figure 28:
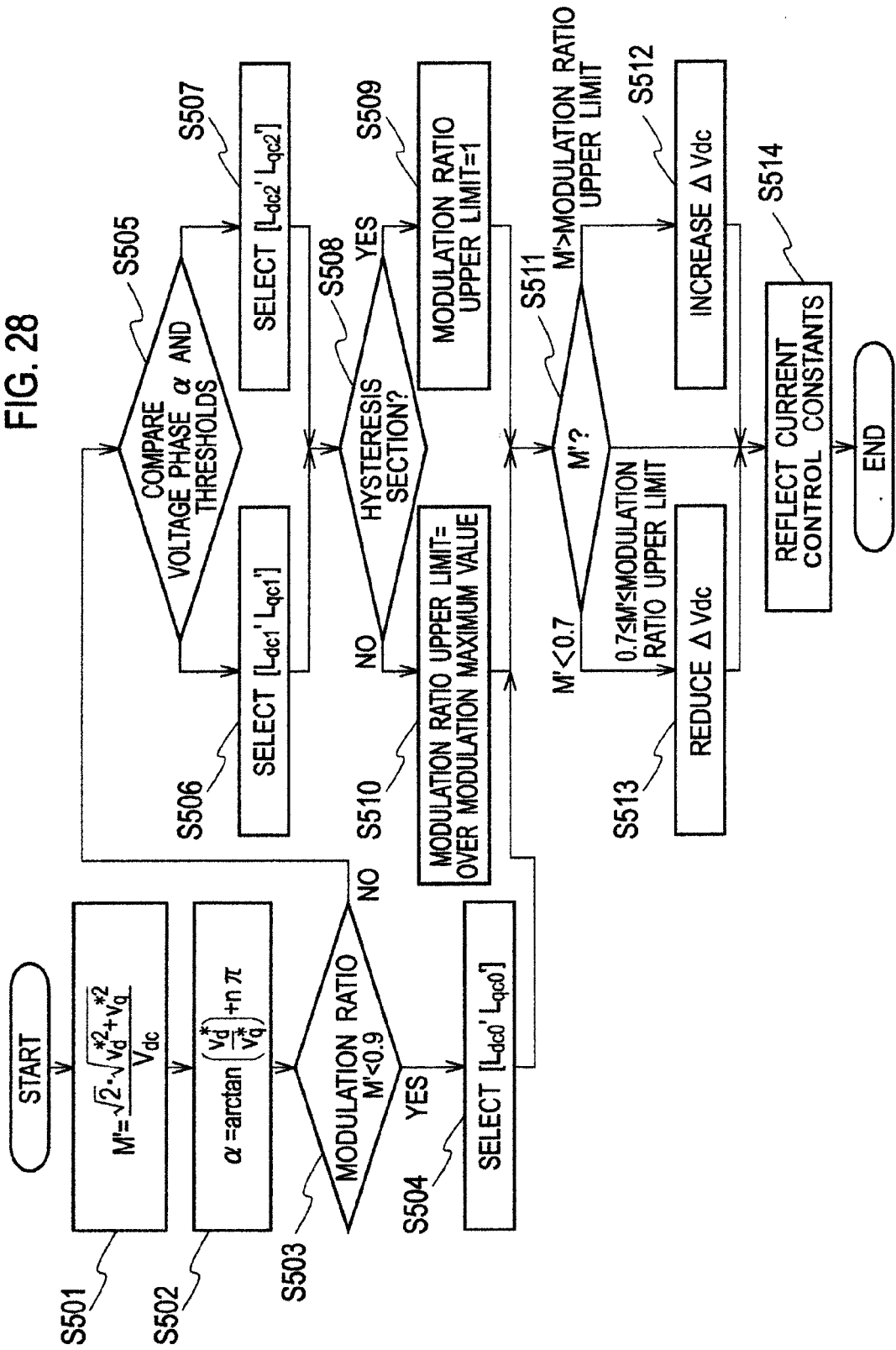
FIG. 28 is a flowchart showing a procedure of control processing for the electric motor performed by the control device for the electric motor in the fifth embodiment to which the present invention is applied.

As shown in FIG. 28, the modulation ratio calculator 21 calculates the modulation ratio M' of the voltage command value in step S501, and the voltage phase calculator 22 calculates the phase α of the voltage command value in step S502. Next, in step S503, the current control constant selector 223 determines whether the modulation ratio M' is smaller than 0.9. When the modulation ratio M' is smaller than 0.9, the processing proceeds to step S504 and the set of current control constants $L_{dc0}'$, $L_{qc0}'$ for the low modulation ratio described in FIG. 26 is selected.

Meanwhile, when the modulation ratio M' is 0.9 or larger, the processing proceeds to step S505 and the thresholds set at ±5° of the boundaries of the quadrants in FIG. 27 are compared with the phase α of the voltage command value and a corresponding one of the sets of current control constants is selected. For example, when the phase α of the voltage command value is within a range of 5° to 85° or 185° to 265° in FIG. 27, the processing proceeds to step S506 and the set of current control constants $L_{dc1}'$, $L_{qc1}'$ for the over-modulation stability (a) is selected. When the phase α of the voltage command value is within a range of 95° to 175° or 275° to 355°, the processing proceeds to step S507 and the set of current control constants $L_{dc2}'$, $L_{qc2}'$ for the over-modulation stability (b) is selected.

After the set of current control constants is selected as described above, subsequently in step S508, the current control constant selector 223 determines whether the phase α of the voltage command value is in any of the hysteresis sections set within ranges of +5° to −5° from the boundaries of the quadrants. When the phase α is in any of the hysteresis sections, the processing proceeds to step S509 and the upper limit of the modulation ratio is set to 1. When the phase α is in none of the hysteresis sections, the processing proceeds to step S510 and the upper limit of the modulation ratio is set to the maximum value Max (for example, 1.1) in the over-modulation state.

After the set of current control constants is selected and the upper limit of the modulation ratio is set as described above, in step S511, the over-modulation suppressor 225 determines whether the modulation ratio M' is larger than the upper limit of the modulation ratio and whether the modulation ratio M' is smaller than 0.7.

When the modulation ratio M' is larger than the upper limit of the modulation ratio, the over-modulation suppressor 225 increases the correction value $\Delta V_{dc}$ for the voltage detection value $V_{dc}$ and outputs it in Step S512 (Note that $\Delta V_{dc} \geq 0$). As shown in FIG. 24, since the correction value $\Delta V_{dc}$ is subtracted from the voltage detection value $V_{dc}$, the voltage detection value $V_{dc}$ to be inputted to a current-voltage conversion unit 2 is reduced and the modulation ratio M' is thereby reduced. Meanwhile, since the modulation ratio M' is small when the modulation ratio M' is smaller than 0.7 in step S511, the over-modulation suppressor 225 reduces the correction value $\Delta V_d$, for the voltage detection value $V_{dc}$ and outputs it in Step S513. This increases the voltage detection value $V_{dc}$ to be inputted to the current-voltage conversion unit 2 and the modulation ratio M' is thereby increased. Moreover, when the modulation ratio M' is equal to or larger than 0.7 and is equal to or smaller than the upper limit of the modulation ratio in step S511, necessity for correction is small. Accordingly, the over-modulation suppressor 225 performs no further processing.

After the over-modulation suppressor 225 performs the control according to the modulation ratio M' as described above, the set of current control constants is outputted through the selector 224 in step S514 and the outputted set of current control constants is reflected in the current control unit 4. Then, the control processing for the electric motor performed by the control device 241 for the electric motor in the embodiment is terminated.

[Effects of Fifth Embodiment]

As described above in detail, the control device 241 for the electric motor in the embodiment selects the set of current control constants at which the electric motor 100 is stable in the over-modulation state, on the basis of the phase α of the voltage command value, to drive the electric motor 100. Accordingly, the electric motor 100 can be controlled to be always stable even in the over-modulation state.

Moreover, the control device 241 for the electric motor in the embodiment stores the set of current control constants for each of the multiple characteristics related to the stability of the electric motor in the over-modulation state, determines that the electric motor 100 is in the over-modulation state when the modulation ratio is equal to or larger than a predetermined value, and selects the set of current control constants at which the electric motor 100 is stable on the basis of the phase α of the voltage command value. Accordingly, the electric motor 100 can be always stably driven even in the over-modulation state by simply storing a minimum number of parameters.

Furthermore, the control device 241 for the electric motor in the embodiment stores the set of current control constants corresponding to the position to be the boundary of the multiple characteristics, and selects the set of current control constants corresponding to the position to be the boundary when the modulation ratio is smaller than the predetermined value. Accordingly, the set of current control constants having a small error with emphasis on responsiveness can be selected in a region of a normal modulation ratio.

Moreover, the control device 241 for the electric motor in the embodiment reduces the modulation ratio of the electric motor 100 at positions where the phase α of the voltage command value is near the boundaries of quadrants. Accordingly, the electric motor 100 is surely prevented from becoming unstable in the boundaries of the quadrants where the electric motor 100 changes from stable to unstable or vise versa.

Furthermore, the control device 241 for the electric motor in the embodiment uses the inductance values of the current control unit 4 as the current control constants. Accordingly, the electric motor 100 can be always stably driven by changing a minimum number of parameters concerning the over-modulation stability.

Sixth Embodiment

Next, the sixth embodiment to which the present invention is applied is described with reference to the drawings. Since an overall configuration of a control device for an electric motor in the embodiment is the same as that in the fifth embodiment described above, description thereof is omitted. Moreover, other parts which are the same as the parts in the fifth embodiment are denoted by the same reference numerals and detailed description thereof is omitted.

[Configuration of Over-Modulation Processing Unit]

Figure 29:
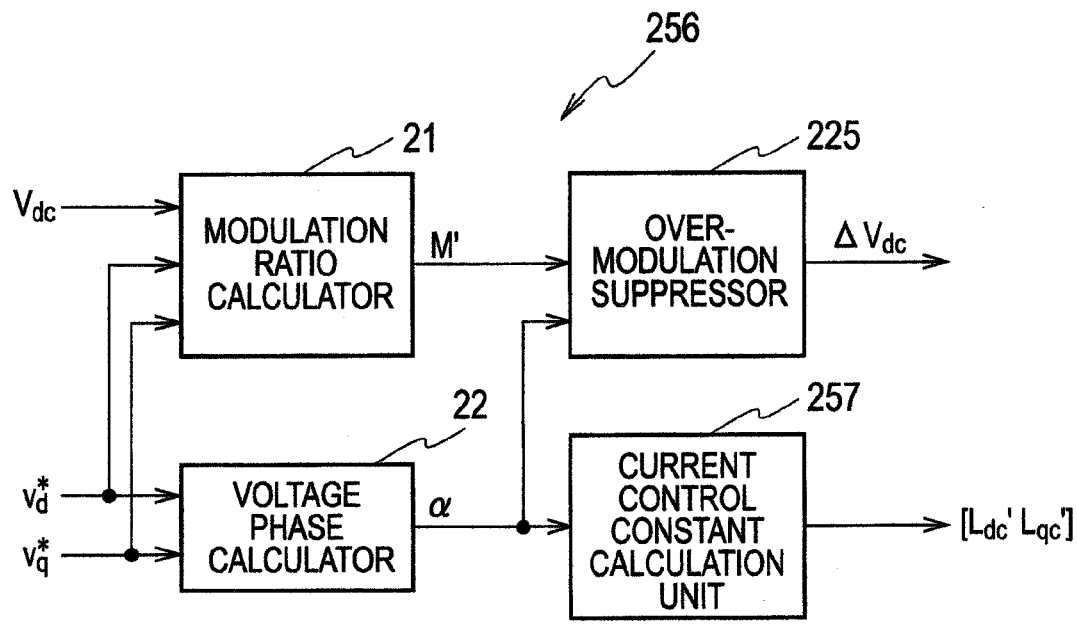
FIG. 29 is a block diagram showing a configuration of an over-modulation processing unit in a sixth embodiment to which the present invention is applied.

FIG. 29 is a block diagram showing a configuration of an over-modulation processing unit in the embodiment. As shown in FIG. 29, the over-modulation processing unit 256 in the embodiment includes: a modulation ratio calculator 21 configured to calculate a modulation ratio M' of an electric motor 100; a voltage phase calculator 22 configured to calculate a phase α of a voltage command value; an over-modulation suppressor 225 configured to suppress the modulation ratio M' when the electric motor 100 is in the over-modulation state; and a current control constant calculation unit 257 configured to calculate a set of current control constants which continuously change according to the phase α of the voltage command value.

Figure 30:
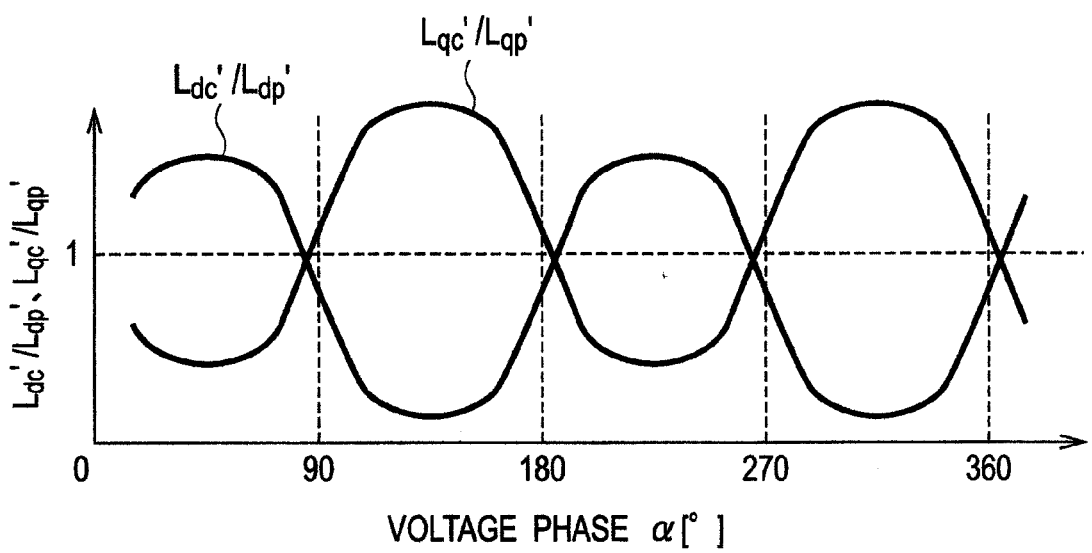
FIG. 30 is a graph for explaining a relationship between inductance ratios and a phase of a voltage command value in the control device for the electric motor in the sixth embodiment to which the present invention is applied.

The current control constant calculation unit 257 has a map recording relationships between the phase α of the voltage command value and inductance ratios $L_{qc}'/L_{qp}'$, $L_{dc}'/L_{dp}'$. As shown in FIG. 30, the inductance ratios $L_{qc}'/L_{qp}'$, $L_{dc}'/L_{dp}'$ are set to continuously change according to the phase α of the voltage command value. Moreover, the inductance ratios $L_{qc}'/L_{qp}'$, $L_{dc}'/L_{dp}'$ are set to be on the stability boundary shown in FIG. 5 at points where the quadrant changes (α=0°, 90°, 180°, 270°, 360°). The current control constant calculation unit 257 obtains the inductance ratios $L_{qc}'/L_{qp}'$, $L_{dc}'/L_{dp}'$ on the basis of the phase α of the voltage command value from the map shown in FIG. 30, and calculates current control constants $L_{dc}'$, $L_{qc}'$ from the inductance ratios. This is possible because electric motor constants $L_{dp}'$, $L_{qp}'$ are fixed in advance.

Figure 31:
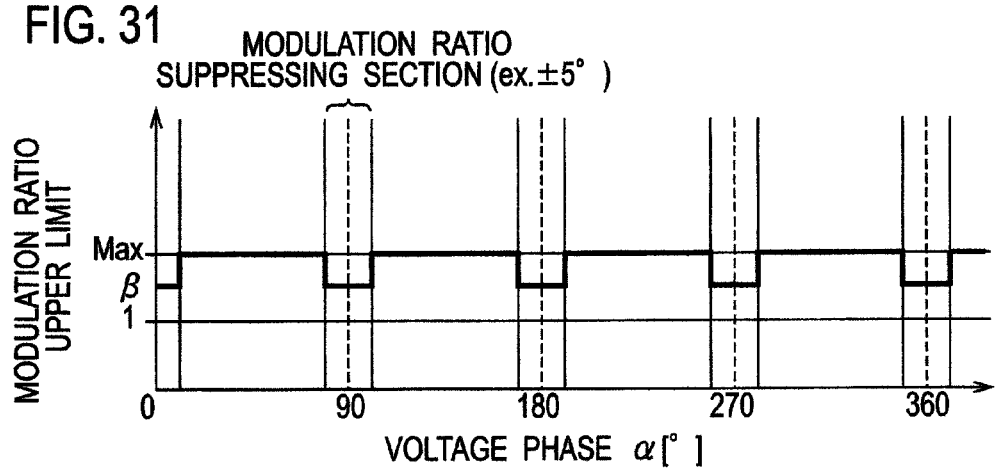
FIG. 31 is a graph for explaining a relationship between a modulation ratio and the phase of the voltage command value in the control device for the electric motor in the sixth embodiment to which the present invention is applied.

The over-modulation suppressor 225 changes a correction value $\Delta V_d$, for a voltage detection value $V_{dc}$ in such a way that the modulation ratio M' becomes equal to or smaller than an upper limit set according to the phase α of the voltage command value, and thereby suppresses the modulation ratio M'. However, in the embodiment, a characteristic is such that the modulation ratio at which divergence occurs in over modulation increases as the phase α of the voltage command value gets closer to points where the quadrant changes (α=0°, 90°, 180°, 270°, 360°) and as the current control constants get closer to the stability boundary. Accordingly, the electric motor 100 is less likely to become unstable in the over-modulation state due to an error in the phase α of the voltage command value. Hence, although the upper limit of the modulation ratio is reduced from the maximum value Max and limited to 1 near the points where the quadrant changes in the fifth embodiment as shown in FIG. 27, the upper limit of the modulation ratio is alleviated from 1 to β (for example, 1.02 to 1.05) near the points where the quadrant changes in the embodiment as shown in FIG. 31. Moreover, the upper limit of the modulation ratio may not be limited near the points where the quadrant changes and be set to the maximum value Max.

[Procedure of Control Processing for Electric Motor]

Next, a procedure of control processing for the electric motor performed by the control device for the electric motor in the embodiment is described with reference to the flowchart of FIG. 32.

Figure 32:
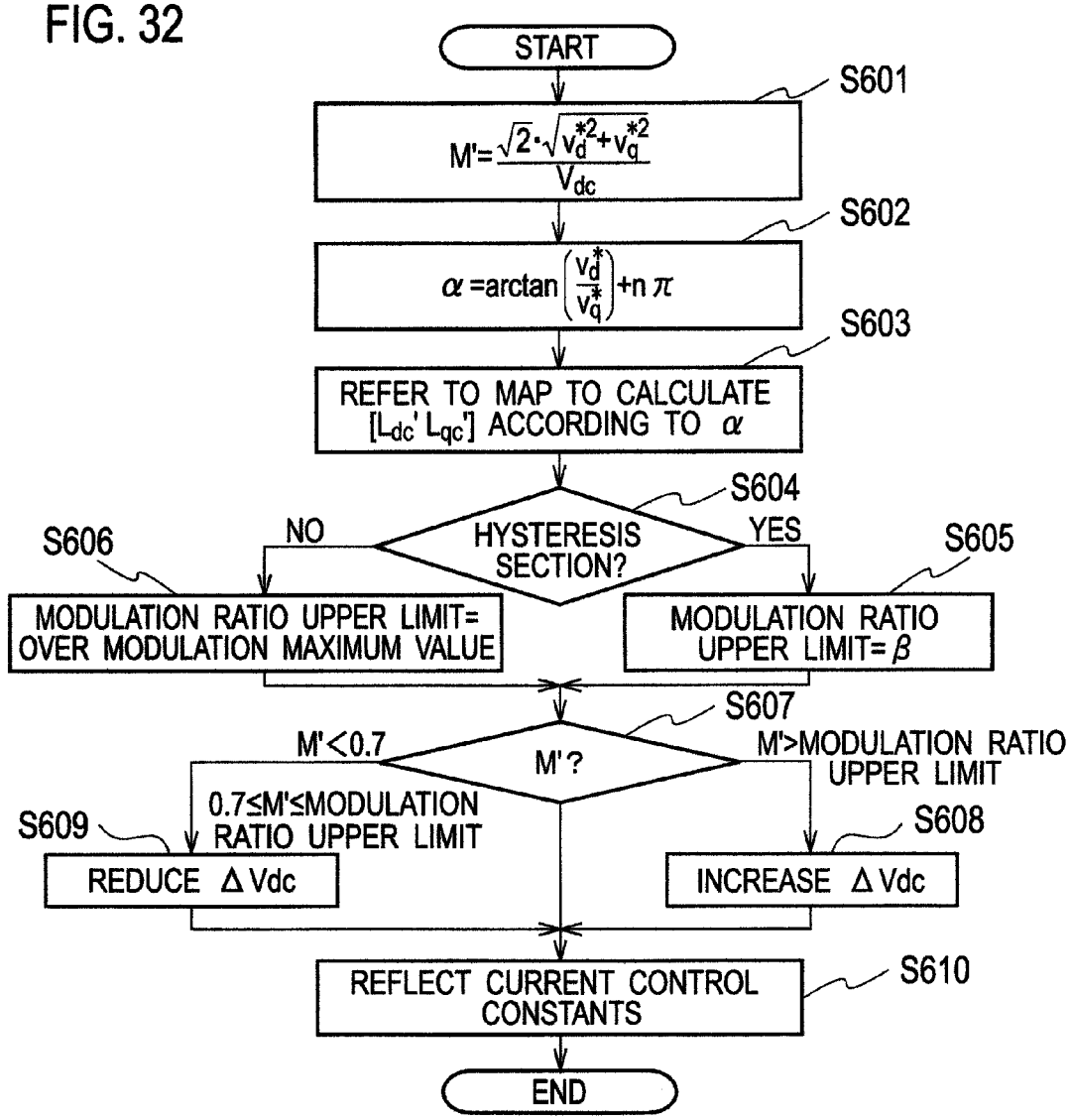
FIG. 32 is a flowchart showing a procedure of control processing for the electric motor performed by the control device for the electric motor in the sixth embodiment to which the present invention is applied.

As shown in FIG. 32, the modulation ratio calculator 21 calculates the modulation ratio M' of the voltage command value in step S601, and the voltage phase calculator 22 calculates the phase α of the voltage command value in step S602. Next, in step S603, the current control constant calculation unit 257 calculates the current control constants $L_{dc}'$, $L_{qc}'$ by referring to the map shown in FIG. 30.

Then, in step S604, whether the phase α of the voltage command value is in any of hysteresis sections set within ranges of +5° to −5° of boundaries of quadrants shown in FIG.

31 is determined. When the phase α is in any of the hysteresis sections, the processing proceeds to step S605 and the upper limit of the modulation ratio is set to β. Meanwhile, when the phase α is in none of the hysteresis sections, the processing proceeds to step S606 and the upper limit of the modulation ratio is set to the maximum value Max (for example, 1.1) in the over-modulation state.

After the current control constants are calculated and the upper limit of the modulation ratio is set as described above, in step S607, the over-modulation suppressor 225 determines whether the modulation ratio M' is larger than the upper limit of the modulation ratio and whether the modulation ratio M' is smaller than 0.7.

When the modulation ratio M' is larger than the upper limit of the modulation ratio, the processing proceeds to step S608 and the over-modulation suppressor 225 increases the correction value $\Delta V_{dc}$ for the voltage detection value $V_{dc}$ and outputs it (Note that $\Delta V_{dc} \geq 0$). Since the correction value $\Delta V_{dc}$ is thereby subtracted from the voltage detection value $V_{dc}$, the voltage detection value $V_{dc}$ to be inputted to a current-voltage conversion unit 2 is reduced and the modulation ratio M' is thereby reduced. Since the modulation ratio M' is small when the modulation ratio M' is smaller than 0.7 in step S607, the correction value $\Delta V_{dc}$ for the voltage detection value $V_{dc}$ is reduced and outputted in step S609. The voltage detection value $V_{dc}$ to be inputted to the current-voltage conversion unit 2 is thereby increased and the modulation ratio M' is increased. Furthermore, when the modulation ratio M' is equal to or larger than 0.7 and is equal to or smaller than the upper limit of the modulation ratio in step S607, necessity for correction is small. Accordingly, the over-modulation suppressor 225 performs no further processing.

After the over-modulation suppressor 225 suppresses the modulation ratio M' as described above, the current control constants are reflected in a current controller included in the current control unit 4 in step S610 and the control processing for the electric motor performed by the control device for the electric motor in the embodiment is terminated.

[Effects of Sixth Embodiment]

As described above in detail, the control device for the electric motor in the sixth embodiment to which the present invention is applied continuously changes the current control constants, according to the phase α of the voltage command value. Thus, the electric motor 100 can be constantly stably driven without a torque shock occurring at the boundaries of the quadrants.

Note that the embodiments described above are examples of the present invention. Thus, the present invention is not limited to the embodiments described above. As a matter of course, it is possible to employ embodiments other than the embodiments described above and to make various changes according to the design as long as the changes are made within the scope of the technical spirit of the present invention.

This application claims the benefit of priority from Japanese Patent Application No. 2011-095197 and Japanese Patent Application No. 2011-095198 filed on Apr. 21, 2011, the contents of which are incorporated by reference in the description of the present invention.

INDUSTRIAL APPLICABILITY

In the control device for the electric motor and the control method for the electric motor in the present invention, the control is performed by determining whether the electric motor is stable or unstable in the over-modulation state. Accordingly, it is possible to improve the usage rate of the power supply voltage at the operation points where the electric motor is stable even in the over-modulation state and thereby achieve improvements in efficiency and output of the electric motor. Moreover, since a situation where the electric motor is unstable in the over-modulation state can be avoided, a system with a high efficiency can be achieved with the stability secured. Accordingly, the control device for the electric motor and the control method for the electric motor in the present invention can be used in industries.

REFERENCE SIGNS LIST

1, 71, 111, 161, 241 control device
2 current-voltage conversion unit
3 low-pass filter
4 current control unit
5 voltage coordinate converter
6 PWM converter
7 DC power source
8 inverter
9 current sensor
10 A/D converter
11 current coordinate converter
12 magnetic pole position detector
13 pulse counter
14 dead-time compensator
15 number-of-revolution calculator
16, 76, 116, 166, 216, 256 over-modulation processing unit
21 modulation ratio calculator
22 voltage phase calculator
23 over-modulation characteristic determination unit
24 phase region determination unit
25 voltage phase limiting unit
26, 225 over-modulation suppressor
100 electric motor
101 transmission
121, 223 current control constant selector
122, 224 selector
171 gear-shift requesting unit
257 current control constant calculation unit

The invention claimed is:

1. A control device configured to control an electric motor by vector control, the control device comprising:

a current control unit configured to calculate a voltage command value used to drive the electric motor, on the basis of a state quantity for voltage command value calculation and a current detection value detected from the electric motor, the state quantity for voltage being calculated from a torque command value used to drive the electric motor; and an over-modulation processing unit configured to (i) determine whether the electric motor is stable or unstable in an over-modulation state, on the basis of a phase of the voltage command value and at least one state quantity for control which is used to control the electric motor, wherein the at least one state quantity for control includes an inductance value of the current control unit and an inductance value of the electric motor, and (ii) drive the electric motor on the basis of a result of the determination, wherein the over-modulation processing unit includes:

an over-modulation characteristic determination unit configured to determine which type of over-modulation stability the electric motor is in while in the over-modulation state, from at least two types of over-modulation stability, on the basis of the inductance value of the current control unit and the inductance value of the electric motor; and a phase region determination unit configured to (i) identify a stable phase region of the voltage command value in which the electric motor is stable in the over-modulation state, according to the type of over-modulation stability the electric motor is in, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not.

2. The control device for an electric motor according to claim 1, wherein the over-modulation processing unit is configured to drive the electric motor in the over-modulation state upon determining that the electric motor is stable in the over-modulation state.

3. The control device for an electric motor according to claim 1, wherein the over-modulation processing unit further includes a voltage phase limiting unit configured to change a current command value in such a way that the phase of the voltage command value is in the stable phase region, the current command value being the state quantity for voltage command value calculation.

4. The control device for an electric motor according to claim 3, wherein the current command value is a current in the magnetic pole direction.

5. The control device for an electric motor according to claim 1, wherein the over-modulation processing unit is configured such that, when determining whether the electric motor is stable or unstable in the over-modulation state, the over-modulation processing unit determines that a state of the electric motor changes to a stable or unstable state every time the phase of the voltage command value moves to a different quadrant on a coordinate system defined in a magnetic pole direction and a direction orthogonal to the magnetic pole direction.

6. The control device for an electric motor according to claim 5, wherein the inductance value of the current control unit and the inductance value of the electric motor are preset in such a way that the type of over-modulation stability that the electric motor is in while in the over-modulation state is constant.

7. The control device for an electric motor according to claim 6, wherein:
a current command value, which is the state quantity for voltage command value calculation, is calculated based on a preset current-voltage conversion map, and
the current-voltage conversion map is preset to enable calculation of a current command value such that the phase of the voltage command value does not move to a different quadrant.

8. The control device for an electric motor according to claim 1, wherein:
the over-modulation processing unit further includes an over-modulation suppressing unit configured to reduce a modulation ratio when the electric motor is determined to be unstable in the over-modulation state, and
the over-modulation suppressing unit is configured such that the over-modulation suppressing unit does not reduce the modulation ratio when the modulation ratio of the electric motor is within a preset threshold.

9. The control device for an electric motor according to claim 1, wherein the over-modulation processing unit stores an inductance value of the current control unit for each of the at least two types of over-modulation stability, and selects one of the inductance values of the current control unit according to the phase of the voltage command value.

10. The control device for an electric motor according to claim 1, wherein:
the electric motor is connected to a transmission, and
the over-modulation processing unit is configured such that, when the electric motor is unstable in the over-modulation state, the over-modulation processing unit moves the phase of the voltage command value to a phase region in which the electric motor is stable in the over-modulation state, by causing the transmission to perform a gear-shift.

11. The control device for an electric motor according to claim 1, wherein:
the electric motor is connected to a drive force transmission mechanism capable of switching a transmission direction of a drive force, and
the over-modulation processing unit is configured such that, when the electric motor is unstable in the over-modulation state, the over-modulation processing unit moves the phase of the voltage command value to a phase region in which the electric motor is stable in the over-modulation state, by switching the transmission direction of the drive force.

12. The control device for an electric motor according to claim 1, wherein:
the electric motor is a power generator, and
the over-modulation processing unit is configured such that, when the power generator is unstable in the over-modulation state, the over-modulation processing unit moves the phase of the voltage command value to a phase region in which the electric motor is stable in the over-modulation state, by moving an operation point of the electric motor, representing a power generation amount and a number of revolutions of the power generator, along an even output line of a graphical representation of a relationship between a power generation amount and the number of revolutions of the power generator, the even output line being a line on the graphical representation at which an output of the electric motor is constant.

13. The control device for an electric motor according to claim 1, wherein
the state quantity for control includes a set of current control constants used by the current control unit to control the electric motor, and
the over-modulation processing unit is configured to store the current control constants, select a current control constant at which the electric motor is stable in the over-modulation state, on the basis of the phase of the voltage command value, and output the selected current control constant to the current control unit.

14. The control device for an electric motor according to claim 13, wherein the over-modulation processing unit is configured to store the current control constant for each of the at least two types of over-modulation stability, determine that the electric motor is in the over-modulation state when a modulation ratio of the electric motor is equal to or larger than a predetermined value, and select the current control constant of the type of over-modulation stability, among the at least two types of over-modulation stability, at which the electric motor is stable, on the basis of the phase of the voltage command value.

15. The control device for an electric motor according to claim 14, wherein the over-modulation processing unit is configured to store the current control constant corresponding to a position at a boundary between the at least two types of over-modulation stability, and select the current control constant corresponding to the position at the boundary when the modulation ratio of the electric motor is smaller than the predetermined value.

16. The control device for an electric motor according to claim 13, wherein the over-modulation processing unit is configured to continuously change the current control constants, according to the phase of the voltage command value.

17. The control device for an electric motor according to claim 13, wherein the over-modulation processing unit is configured to reduce a modulation ratio of the electric motor at a position where the phase of the voltage command value is near a boundary of quadrants.

18. The control device for an electric motor according to claim 13, wherein the current control constants are the inductance values of the current control unit.

19. A control method for controlling an electric motor by vector control, the method comprising:
  calculating a voltage command value used to drive the electric motor, on the basis of a state quantity for voltage command value calculation and a current detection value detected from the electric motor, the state quantity for voltage being calculated from a torque command value used to drive the electric motor; and
  determining whether the electric motor is stable or unstable in an over-modulation state, on the basis of a phase of the voltage command value and at least one state quantity for control which is used to control the electric motor, wherein the at least one state quantity for control includes an inductance value of a current control unit and an inductance value of the electric motor; and
  driving the electric motor on the basis of a result of the determination,
  wherein the step of determining whether the electric motor is stable or unstable in the over-modulation state, on the basis of the phase of the voltage command value and the at least one state quantity for control which is used to control the electric motor includes:
    determining which type of over-modulation stability the electric motor is in while in the over-modulation state, from at least two types of over-modulation stability, on the basis of the inductance value of the current control unit and the inductance value of the electric motor;
    identifying a stable phase region of the voltage command value in which the electric motor is stable in the over-modulation state, according to the type of over-modulation stability the electric motor is in, on the basis of quadrants on a coordinate system defined in a magnetic pole direction and a direction orthogonal to the magnetic pole direction;
    determining whether the electric motor is stable or unstable in the over-modulation state, on the basis of whether the phase of the voltage command value is in the stable phase region or not.

20. A control device configured to control an electric motor by vector control, the control device comprising:
  current control means for calculating a voltage command value used to drive the electric motor, on the basis of a state quantity for voltage command value calculation and a current detection value detected from the electric motor, the state quantity for voltage being calculated from a torque command value used to drive the electric motor; and
  over-modulation processing means for (i) determining whether the electric motor is stable or unstable in an over-modulation state, on the basis of a phase of the voltage command value and at least one state quantity for control which is used to control the electric motor, wherein the at least one state quantity for control includes an inductance value of the current control means and an inductance value of the electric motor, and (ii) driving the electric motor on the basis of a result of the determination,
  wherein the over-modulation processing means includes:
    over-modulation characteristic determination means for determining which type of over-modulation stability the electric motor is in while in the over-modulation state, from at least two types of over-modulation stability, on the basis of the inductance value of the current control means and the inductance value of the electric motor; and
    phase region determination means for (i) identifying a stable phase region of the voltage command value in which the electric motor is stable in the over-modulation state, according to the type of over-modulation stability the electric motor is in on the basis of quadrants on a coordinate system defined in a magnetic pole direction and a direction orthogonal to the magnetic pole direction, and (ii) determining whether the electric motor is stable or unstable in the over-modulation state, on the basis of whether the phase of the voltage command value is in the stable phase region or not.

21. A control device configured to control an electric motor by vector control, the control device comprising:
  a current control unit configured to calculate a voltage command value used to drive the electric motor, on the basis of a state quantity for voltage command value calculation and a current detection value detected from the electric motor, the state quantity being calculated from a torque command value used to drive the electric motor; and
  an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination,
  wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not, and
  wherein the over-modulation processing unit is configured such that, when determining whether the electric motor is stable or unstable in the over-modulation state, the over-modulation processing unit determines that a state of the electric motor changes to a stable or unstable state every time the phase of the voltage command value moves to a different quadrant on the coordinate system defined in the magnetic pole direction and the direction orthogonal to the magnetic pole direction.

22. A control device configured to control an electric motor by vector control, the control device comprising:
  a current control unit configured to calculate a voltage command value used to drive the electric motor, on the basis of a state quantity for voltage command value calculation and a current detection value detected from the electric motor, the state quantity being calculated from a torque command value used to drive the electric motor; and an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination, wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not, wherein the over-modulation processing unit further includes an over-modulation suppressing unit configured to reduce a modulation ratio when the electric motor is determined to be unstable in the over-modulation state, and wherein the over-modulation suppressing unit is configured such that the over-modulation suppressing unit does not reduce the modulation ratio when the modulation ratio of the electric motor is within a preset threshold.

23. A control device configured to control an electric motor by vector control, the control device comprising:

a current control unit configured to calculate a voltage command value used to drive the electric motor, on the basis of a state quantity for voltage command value calculation and a current detection value detected from the electric motor, the state quantity being calculated from a torque command value used to drive the electric motor; and an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination, wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not, and wherein the over-modulation processing unit stores an inductance value of the current control unit for each of at least two types of over-modulation stability, and selects one of the inductance values of the current control unit according to the phase of the voltage command value.

24. A control device configured to control an electric motor by vector control, the control device comprising:

a current control unit configured to calculate a voltage command value used to drive the electric motor, on the basis of a state quantity for voltage command value calculation and a current detection value detected from the electric motor, the state quantity being calculated from a torque command value used to drive the electric motor; and an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination, wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not, wherein the electric motor is connected to a transmission, and wherein the over-modulation processing unit is configured such that, when the electric motor is unstable in the over-modulation state, the over-modulation processing unit moves the phase of the voltage command value to a phase region in which the electric motor is stable in the over-modulation state, by causing the transmission to perform a gear-shift.

25. A control device configured to control an electric motor by vector control, the control device comprising:

a current control unit configured to calculate a voltage command value used to drive the electric motor, on the basis of a state quantity for voltage command value calculation and a current detection value detected from the electric motor, the state quantity being calculated from a torque command value used to drive the electric motor; and an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination, wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not, wherein the electric motor is connected to a drive force transmission mechanism capable of switching a transmission direction of a drive force, and wherein the over-modulation processing unit is configured such that, when the electric motor is unstable in the over-modulation state, the over-modulation processing unit moves the phase of the voltage command value to a phase region in which the electric motor is stable in the over-modulation state, by switching the transmission direction of the drive force.

26. A control device configured to control an electric motor by vector control, the control device comprising:
- a current control unit configured to calculate a voltage command value used to drive the electric motor, on the basis of a state quantity for voltage command value calculation and a current detection value detected from the electric motor, the state quantity being calculated from a torque command value used to drive the electric motor; and
- an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination,
- wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not,
- wherein the electric motor is a power generator, and
- wherein the over-modulation processing unit is configured such that, when the power generator is unstable in the over-modulation state, the over-modulation processing unit moves the phase of the voltage command value to a phase region in which the electric motor is stable in the over-modulation state, by moving an operation point of the electric motor, representing a power generation amount and a number of revolutions of the power generator, along an even output line of a graphical representation of a relationship between a power generation amount and the number of revolutions of the power generator, the even output line being a line on the graphical representation at which an output of the electric motor is constant.

27. A control device configured to control an electric motor by vector control, the control device comprising:
- a current control unit configured to calculate a voltage command value used to drive the electric motor, on the basis of a state quantity for voltage command value calculation and a current detection value detected from the electric motor, the state quantity being calculated from a torque command value used to drive the electric motor; and
- an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination,
- wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not,
- wherein the state quantity for control includes a set of current control constants used by the current control unit to control the electric motor,
- wherein the over-modulation processing unit is configured to store the current control constants, select a current control constant at which the electric motor is stable in the over-modulation state, on the basis of the phase of the voltage command value, and output the selected current control constant to the current control unit,
- wherein the over-modulation processing unit is configured to store the current control constant for each of at least two types of over-modulation stability, determine that the electric motor is in the over-modulation state when a modulation ratio of the electric motor is equal to or larger than a predetermined value, and select the current control constant of the type of over-modulation stability, among the at least two types of over-modulation stability, at which the electric motor is stable, on the basis of the phase of the voltage command value, and
- wherein the over-modulation processing unit is configured to store the current control constant corresponding to a position at a boundary between the at least two types of over-modulation stability, and select the current control constant corresponding to the position at the boundary when the modulation ratio of the electric motor is smaller than the predetermined value.

28. A control device configured to control an electric motor by vector control, the control device comprising:
- a current control unit configured to calculate a voltage command value used to drive the electric motor, on the basis of a state quantity for voltage command value calculation and a current detection value detected from the electric motor, the state quantity being calculated from a torque command value used to drive the electric motor; and
- an over-modulation processing unit configured to (i) determine whether the electric motor is stable or unstable in an over-modulation state, on the basis of a phase of the voltage command value and at least one state quantity for control which is used to control the electric motor, and (ii) drive the electric motor on the basis of a result of the determination,
- wherein the over-modulation processing unit is configured to (i) identify a stable phase region of the voltage command value in which the electric motor is stable in the over-modulation state, on the basis of quadrants on a coordinate system defined in a magnetic pole direction and a direction orthogonal to the magnetic pole direction, and (ii) determine whether the electric motor is stable or unstable in the over-modulation state, on the basis of whether the phase of the voltage command value is in the stable phase region or not,
- wherein the state quantity for control includes a set of current control constants used by the current control unit to control the electric motor,
- wherein the over-modulation processing unit is configured to store the current control constants, select a current control constant at which the electric motor is stable in the over-modulation state, on the basis of the phase of the voltage command value, and output the selected current control constant to the current control unit, and
- wherein the over-modulation processing unit is configured to continuously change the current control constants, according to the phase of the voltage command value.

* * * * *